US011969871B2

(12) United States Patent
Takata et al.

(10) Patent No.: US 11,969,871 B2
(45) Date of Patent: Apr. 30, 2024

(54) PORTABLE POWER TOOL

(71) Applicant: MAKITA CORPORATION, Anjo (JP)

(72) Inventors: Tomoki Takata, Anjo (JP); Takuji Kimura, Anjo (JP); Atsushi Kanou, Anjo (JP)

(73) Assignee: MAKITA CORPORATION, Anjo (JP)

( * ) Notice: Subject to any disclaimer, the term of this patent is extended or adjusted under 35 U.S.C. 154(b) by 11 days.

(21) Appl. No.: 17/674,243

(22) Filed: Feb. 17, 2022

(65) Prior Publication Data

US 2022/0305634 A1 Sep. 29, 2022

(30) Foreign Application Priority Data

Mar. 26, 2021 (JP) ................................ 2021-052784

(51) Int. Cl.
*B25F 5/02* (2006.01)
*B24B 23/04* (2006.01)

(52) U.S. Cl.
CPC ................ *B25F 5/02* (2013.01); *B24B 23/04* (2013.01)

(58) Field of Classification Search
CPC . B25G 3/06; B23D 51/01; G05G 1/06; Y10T 16/469; Y10T 16/4713
See application file for complete search history.

(56) References Cited

U.S. PATENT DOCUMENTS

| | | | | |
|---|---|---|---|---|
| 5,558,570 A | 9/1996 | Nakamura et al. | | |
| 2007/0000093 A1* | 1/2007 | Powell | B25F 5/02 | 16/430 |
| 2011/0003541 A1* | 1/2011 | Liu | B25F 5/026 | 451/359 |

FOREIGN PATENT DOCUMENTS

| | | |
|---|---|---|
| JP | S56-25802 Y2 | 6/1981 |
| JP | H07-276261 A | 10/1995 |
| JP | 2006-212807 A | 8/2006 |
| JP | 2007-260795 A | 10/2007 |
| JP | 2011-031383 A | 2/2011 |
| JP | 2013-220493 A | 10/2013 |
| WO | 2018/168421 A1 | 9/2018 |

* cited by examiner

*Primary Examiner* — Daniel Jeremy Leeds
(74) *Attorney, Agent, or Firm* — Oliff PLC

(57) ABSTRACT

A portable power tool includes a tool accessory, drive mechanism, housing and grip having a rotating axis. The grip includes grip portion having a first face and a second face. The grip portion is formed in a rotation asymmetric shape to the rotating axis. The grip is attachable to the housing with respect to a rotating angle around the rotating axis at a first angle and a second angle. When the grip is viewed in the rotating axis extending direction, the position of the first surface and the position of the second surface in the circumferential direction around the rotating axis in a case that the rotating angle is at the first angle are different from the position of the first surface and the position of the second surface in the circumferential direction around the rotating axis in a case that the rotating angle is at the second angle.

16 Claims, 15 Drawing Sheets

PORTABLE POWER TOOL

CROSS REFERENCE TO RELATED ART

The present application claims priority to Japanese Patent Application No. 2021-52784 filed on Mar. 26, 2021, the disclosure of which is hereby incorporated by reference in its entirety.

TECHNICAL FIELD

The present disclosure relates to portable a power tool having a tool accessory that orbits and/or rotates to perform a processing operation on a workpiece or surface, such as sanding, abrading, polishing or grinding.

BACKGROUND

As a portable power tool, JP2011-31383A discloses a sander having a drive mechanism, a rotating work face disposed at the lower side of the drive mechanism so as to be rotatably driven by the drive mechanism, and a tubular housing to house the drive mechanism. A movable handle that can be secured at any arbitrary position in the circumferential direction is mounted to the housing.

SUMMARY

In JP2011-31383A described above, user can fixedly mount the movable handle at any arbitrary position in the circumferential direction according to the working state. On the other hand, a portable power tool having a tool accessory that orbits and/or rotates to perform a processing operation on a workpiece or surface, such as sanding, abrading, polishing or grinding, easily operable for the user has been recently desired.

According to one aspect of the present disclosure, a portable (hand-held) power tool is provided. The portable power tool includes a tool accessory, a drive mechanism, a housing and a grip. The tool accessory is configured to undergo an orbital and/or rotational motion. The drive mechanism is configured to drive the tool accessory. The housing houses the drive mechanism.

The grip includes is arranged to be rotatable around a rotating axis. The grip includes a grip portion.

The grip portion includes a first surface and a second surface with different shape from the first surface such that the grip portion is formed in a rotation asymmetric shape to the rotating axis.

The grip is attachable to the housing at a first angle with respect to the rotating angle around the rotating axis. Further, the grip is attachable to the housing at a second angle different from the first angle.

When the grip is viewed in the rotating axis extending direction, the position of the first surface and the position of the second surface in the circumferential direction around the rotating axis in a case that the rotating angle is at the first angle are different from the position of the first surface and the position of the second surface in the circumferential direction around the rotating axis in a case that the rotating angle is at the second angle.

As used herein, the term "tool accessory" is intended to encompass, without limitation, pads or plates designed to detachably hold sandpaper (e.g., abrasive disks or rectangular abrasive papers), a polishing material such as a sponge pad, a felt pad, a wool pad, a bonnet, etc., by using, e.g., a hook-and-loop type fastener, clamps, clips, etc., as well as other types of accessories or attachments that may be integrally attached to a device (e.g., a splined collar, a lock nut, etc.) designed to detachably attach the accessory or attachment to the drive shaft (output shaft), such as a disk (e.g., a grinding disk), an integrated pad or abrasive pad, a wire wheel, a wire brush, a nylon wheel, a nylon brush, etc.

According to this aspect, the user can change the position where the first face and the second face are shown by switching the rotating angle of the grip between the first angle and the second angle. Therefore, the user can hold the grip by rotating in accordance with the working aspects. Thus, operability of the portable power tool is enhanced.

According to the second aspect of the present disclosure, a portable power tool is provided. The portable power tool includes a tool accessory, a drive mechanism that is configured to drive the tool accessory, a housing that houses the drive mechanism and a grip.

The grip is arranged to be rotatable around a rotating axis. The grip is attachable to the housing at least at a first angle of the rotating angle around the rotating axis. The grip includes a grip portion and a shaft projecting from the grip portion to extend along the rotating axis and an engaging portion projecting from the shaft in a direction crossing the rotating axis.

The housing includes a first space, a second space and a third space.

The first space has a shape to accommodate the engaging portion when the rotating angle is at the first angle. The first space is arranged to restrict the rotation of the engaging portion around the rotating axis.

With respect to the rotating axis extending direction in which the direction that the grip departs from the housing is defined as a first direction and the direction opposing to the first direction is defined as a second direction, the first space is also arranged to restrict the movement of the engaging portion from the first space in the first direction by the contact of the inner face of the housing forming the first space with the engaging portion.

The second space is provided in the first space at the side of the second direction to communicate the first space. The second space has a shape to allow the rotation of the engaging portion around the rating axis.

The third space is provided along the rotating axis extending direction to communicate the second space with the external space of the housing. The third space accommodates the engaging portion movably along the rotating axis extending direction when the rotating axis is at the third angle different from the first angle. The third space restricts the rotation of the engaging portion around the rotating axis by the contact of the inner face of the housing forming the third space with the engaging portion.

According to this aspect, the rotating angle of the grip is switched to the third angle different from the first angle, the engaging member is moved to the second space along the third space, the rotating angle is switched to the first angle in the second space and then, the engaging member is disposed and accommodated in the first space. Therefore, the grip can be attached to the housing at the first angle.

Further, the grip mounted to the housing by being accommodated in the first space at the first angle is moved to the first direction along the third space after being switched to the third angle in the second space. Thus, the grip can be detached from the housing. Therefore, just by switching the angle, grip can be attached and detached to the housing by moving the grip along the rotating axis extending direction.

As a result, operability of the portable power tool is enhanced.

DETAILED DESCRIPTION OF THE EMBODIMENTS

Figure 1:
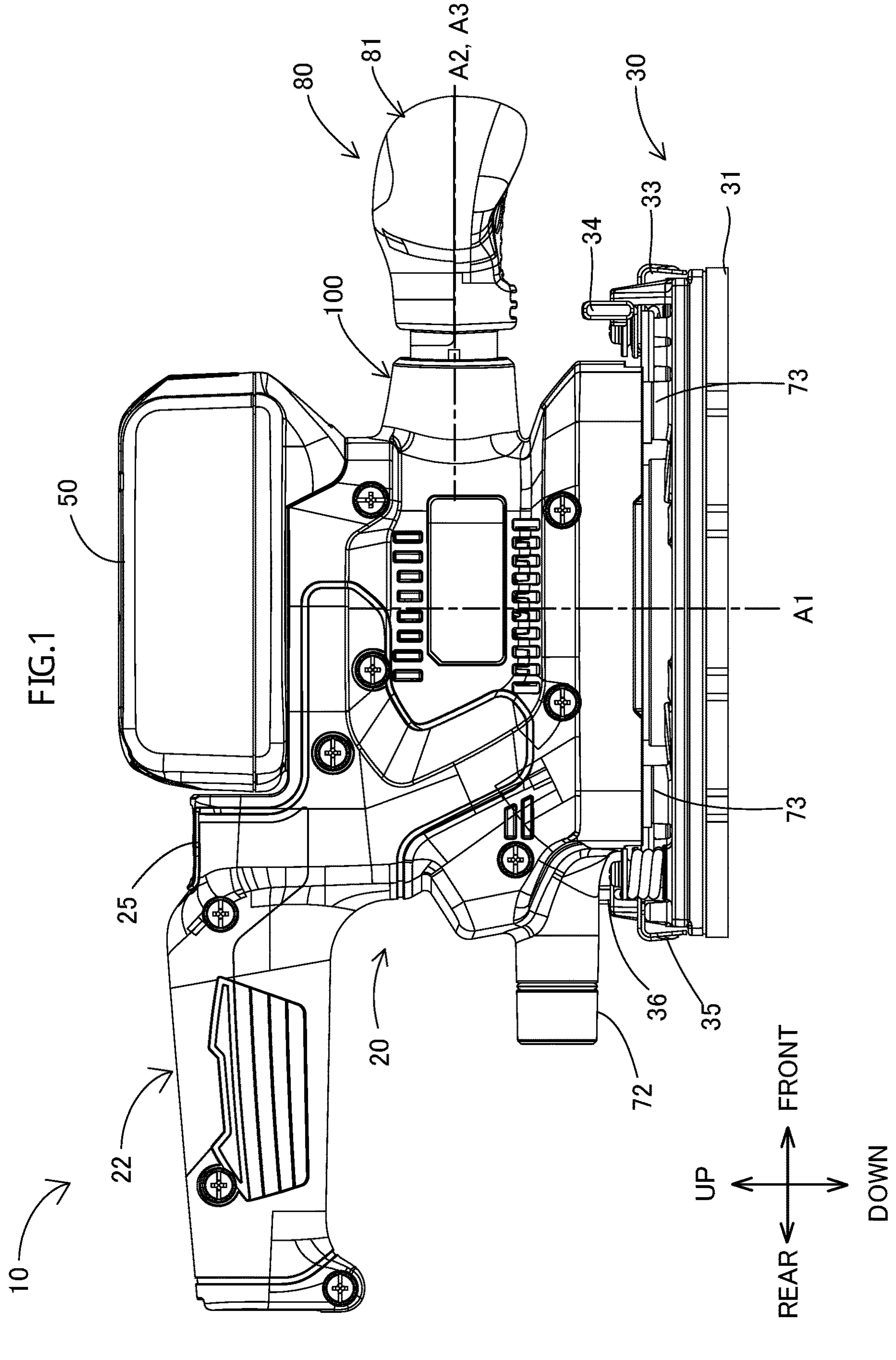
FIG. 1 shows a right-side view of the sander according to one embodiment, in which the first face of the grip is positioned at the upper side, while the second face at the lower side.

In one non-limiting embodiment according to the present disclosure, the drive mechanism may include a drive shaft, one end of which is operably connected to the tool accessory. When the drive shaft extending direction is defined as an upper-lower direction, the side that the one end of the drive shaft is connected to the tool accessory as a lower side of the upper-lower direction and the side that opposes to the lower side as an upper side of the upper-lower direction, the grip may be arranged in a case that the rotation angle is at the first angle such that the first surface is positioned at the upper side of the grip. The grip may be arranged in a case that the rotation angle is at the first angle such that the second surface is positioned at the lower side of the grip.

According to the above-described embodiment, in a structure that the first surface presents at the upper side and the second surface presents at the lower side when the rotating angle of the grip is at the first angle, the operability of the portable power tool is enhanced.

In addition or in the alternative to the preceding embodiments, the drive mechanism may include a drive shaft, one end of which is connected to the tool accessory. When the drive shaft extending direction is defined as an upper-lower direction, the side that the one end of the drive shaft is connected to the tool accessory as a lower side of the upper-lower direction and the side that opposes to the lower side as an upper side of the upper-lower direction, the grip may be arranged in a case that the rotation angle is at the second angle such that the second surface is positioned at the upper side of the grip. The grip may be arranged in a case that the rotation angle is at the second angle such that the first surface is positioned at the lower side of the grip.

According to the above-described embodiment, in a structure that the second surface presents at the upper side and the first surface presents at the lower side when the rotating angle of the grip is at the second angle, the operability of the portable power tool is enhanced.

Especially, according to the structure, in a case that the rotation angle is at the first angle, the first surface is positioned at the upper side of the grip and the second surface is positioned at the lower side of the grip as well as, in a case that the rotation angle is at the second angle such that the second surface is positioned at the upper side of the grip and the first surface is positioned at the lower side of the grip, the surface shape presented at the upper side and at the lower side can be switched, from the first surface to the second surface or from the second surface to the first surface.

In addition or in the alternative to the preceding embodiments, the second surface may be provided with a projection. The projection may be provided at the remote side end from the housing in the rotating axis extending direction. The projection may project in the direction to depart from the rotating axis.

According to the above-described embodiment, the user can engage the fingers with the projection, the grip portion can be easily held in comparison with the structure in which the second surface does not include projection. Therefore, operability of the portable power tool is enhanced.

Especially according to a structure that the second surface is provided with the projection and the second surface is positioned at the lower side when the rotating angle is at the first angle, the user can easily engage fingers with the projection when holding the grip portion from the upper side. Therefore, operability of the portable power tool is further enhanced.

In addition or in the alternative to the preceding embodiments, when the grip portion is viewed from the position opposing to the second surface, the projection may be formed in a crescent-moon shape. The crescent-moon shape may be arranged such that the housing side of the projection recesses and the side remote from the housing inflates.

According to the embodiment as described above, the user can perform a processing operation on a workpiece or surface such as sanding, abrading, polishing or grinding, by pushing the palm to the second surface following the palm edge along the projection. Thus, the grip can be variously held and operability of the portable power tool is further enhanced.

Especially in a structure that the second surface is positioned at the upper side when the rotating angle is at the second angle, the user can easily move the portable power tool in the desired moving direction by pushing the palm to the second surface and pushing the portable power tool to the work. Further, for example, in a finishing step in the processing operation, the work is done by reducing the pushing force to the portable power tool. In such a case, the portable power tool can be easily moved in the desired direction by applying appropriate force to the downward.

In addition or in the alternative to the preceding embodiments, the first surface may be formed smooth. The grip portion may be formed in oval shape having a longitudinal axis in a direction crossing the rotating axis when the grip portion is viewed from the position opposing to the first surface.

According to the above-described embodiment, the user can easily hold the grip portion as wrapping the first surface by the palm. Therefore, operability of the portable power tool is enhanced.

Especially, according to the structure that in a case that the rotation angle of the grip is at the first angle such that the first surface is positioned at the upper side and the second surface is positioned at the lower side as well as the project is provided on the second surface, the user can hold the grip portion by engaging fingers with the projection of the second surface as wrapping the first surface by the palm. Therefore, the user can stably hold the grip portion.

In addition or in the alternative to the preceding embodiments, the grip may include a shaft and an engaging portion. The shaft may project from the grip portion and extend along the rotating axis. The engaging portion may project from the shaft in a direction crossing the rotating axis.

The housing may include a first space and a second space.

The first space may accommodate the engaging portion in a case that the rotating angle of the grip is at the first angle. Otherwise, the first space may accommodate the engaging portion in a case that the rotating angle of the grip is at the second angle. The first space may restrict the rotating of the engaging portion around the rotating axis by the contact of the inner face of the housing forming the first space with the engaging portion.

With respect to the rotating axis extending direction in which the direction that the grip departs from the housing is defined as a first direction and the direction opposing to the first direction is defined as a second direction, the second space may be provided at the side of the second direction of the first space to communicate the first space, such that engaging portion has a rotatable shape around the rotating axis.

According to the above-described embodiment, by accommodating the engaging portion in the first space as setting the rotating angle of the grip at the first angle or the second angle, the user can mount the grip to the housing. Therefore, the rotating angle of the grip can be easily switched.

In addition or in the alternative to the preceding embodiments, the first space may further restrict the engaging member from moving from the first space in the first direction by a contact of the inner face of the housing forming the first space in the first direction with the engaging member.

According to the above-described embodiment, the engaging member accommodated in the first space can be restricted from moving from the first space to the first direction.

In addition or in the alternative to the preceding embodiments, the housing may further include a third space formed along the rotating axis extending direction to communicate the first space with the external space of the housing. When the rotating angle is at the third angle different from the first angle and the second angle, the third space may accommodate the engaging portion movably along the rotating axis extending direction. The third space may be arranged to restrict the rotation of the engaging member around the rotating axis by a contact of the inner face of the housing forming the third space with the engaging member.

According to the above-described embodiment, the user can insert the grip to the housing by setting the rotating angle of the grip at the third angle and by moving the engaging member in the second direction along the third space. Further, the user can mount the grip to the housing by rotating the rotating angle to the first angle or the second angle to rotate the engaging member and then, by accommodating the engaging member in the first space. Further, the grip can be detached from the housing such that the engaging member accommodated in the first space is rotated in the second space and then, moved in the first direction along the third space.

In addition or in the alternative to the preceding embodiments, the grip may further include a biasing member. The biasing member may be arranged to bias the engaging member accommodated in the first space in the first direction.

According to the above-described embodiment, the engaging member accommodated in the first space is biased in the first direction by the biasing member and therefore, difficult to move from the first space to the second space. Thus, the engaging member can be restricted from moving to the second space and from rotating apart from user's intention. Therefore, the grip can be restricted from inadvertently rotating and dropping out from the housing.

In addition or in the alternative to the preceding embodiments, the grip may be detachable from the housing when the rotating angle is at the third angle different from the first angle and the second angle.

According to the above-described embodiment, the grip can be detached from the housing when at the third angle.

<Entire Structure>

Hereinafter, in reference to the drawings, an orbital sander 10 is explained as one embodiment of the portable power tool (hereinafter simply referred to as "sander"). The sander 10 is also called as "finishing sander".

As shown from FIG. 1 to FIG. 4, the sander 10 includes a drive mechanism 60 having a drive shaft 66 (see FIG. 2), a housing to house (to accommodate) the drive mechanism 60, a tool accessory (sanding/polishing part) 30 to which one end 661 of the drive shaft 66 is connected, and a grip connected to the housing 20. Hereinafter, the center axis of the drive shaft 66 is also referred to as a "drive axis A1". The tool accessory 30 is configured to undergo an orbital motion when the drive shaft 66 rotates.

The sander 10 further includes a handle 22 connected to the housing 20 and a battery mounting portion 40. The handle 22 extends in a direction to cross the drive axis A1. One end of the handle 22 is connected to the housing 20 and the other end of the handle 22 is provided as a free end.

Hereinafter, the direction in which the drive axis A1 extends is defined as "upper-lower direction". As to the upper-lower direction, one side of which that one end 661 of the drive shaft 66 and the tool accessory 30 are connected is defined as "lower side" and the opposite side of the lower side is defined as "upper side". And the direction in which the handle 22 extends is defined as "front-rear direction" of the sander 10. Further, the direction crossing both the upper-lower direction and the front-rear direction is defined as "right-left direction" of the sander 10. As to the right-left direction, the right side when viewed from the rear side to the front side is defined as "right side" of the sander 10, and the opposite side of the right side is defined as "left side" of the sander 10.

The housing 20 forms an outer contour of the sander 10. The front end of the housing 20 is provided as a grip mounting portion 100 to which the grip 80 is mounted. According to this embodiment, the grip 80 is attachable and detachable to the grip mounting portion 100. The details of the grip 80 and the grip mounting portion 100 are later explained.

Figure 2:
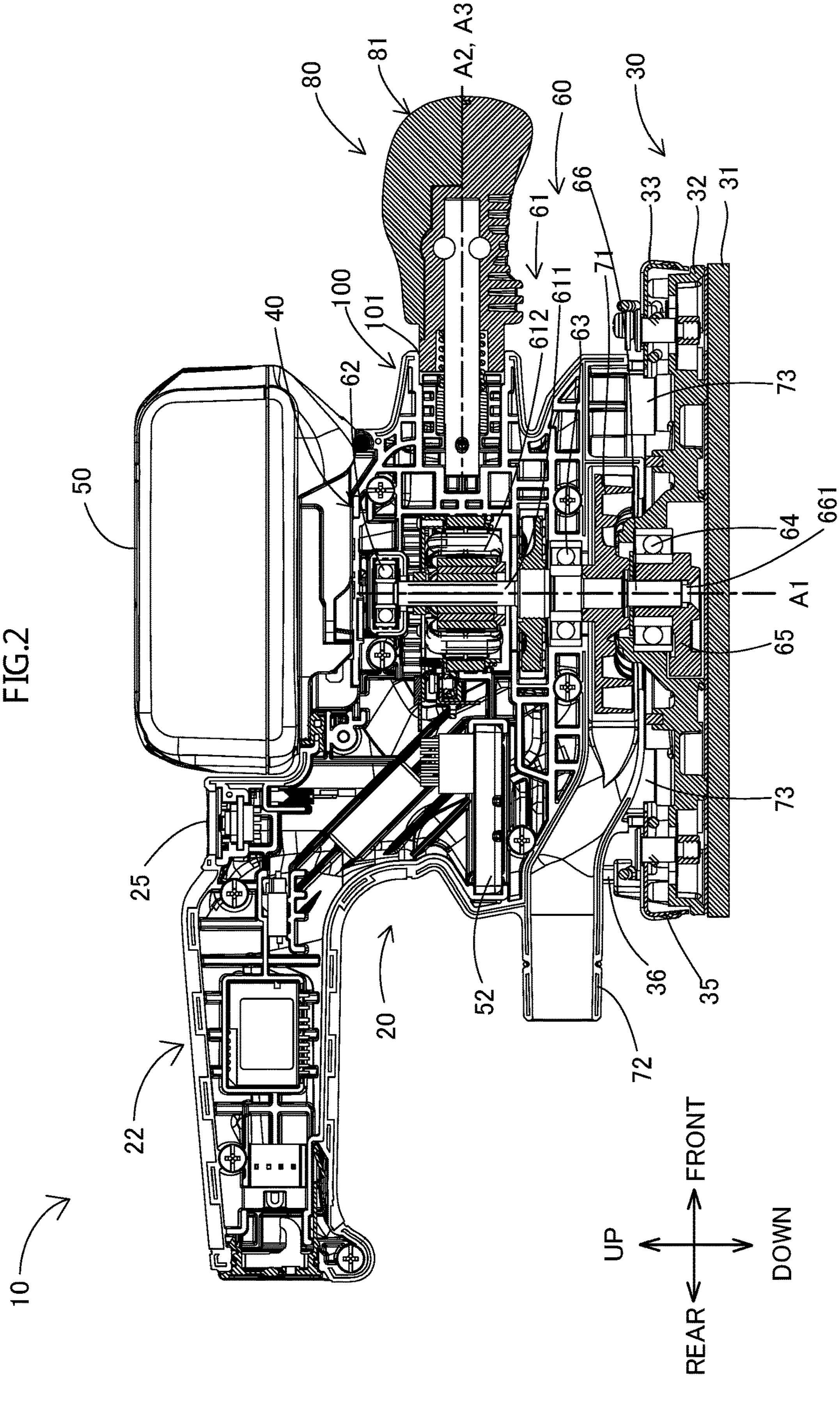
FIG. 2 shows a longitudinal sectional view of the sander to explain the overview of the inner construction.

As shown in FIG. 2, the drive mechanism 60 includes an electric motor 61. The drive mechanism 60 is provided to drive the tool accessory 30 by the electric motor 61. As shown in FIG. 2, according to this embodiment, the electric motor 61 is a blushless motor. However, the electric motor 61 can be arranged by a motor with blush.

The electric motor 61 includes a motor shaft 611 extending in upper-lower direction and a motor main body 612 having a stator and a rotor. The motor shaft 611 is rotatably held by bearings 62, 63 respectively fixed to the housing 20. The motor shaft 611 is disposed substantially at the center of the tool accessory 30 as viewed in the upper-lower direction. The lower part of the motor shaft 611 is operably connected to the drive shaft 66. The drive shaft 66 is rotatably held by bearings 62, 63 respectively fixed to the housing 20. Rotating drive force of the motor 61 is transmitted to the tool accessory 30 via the motor shaft 611 and the drive shaft 66. Note that the rotating drive force of the motor 61 is reduced by a known drive force transmitting mechanism (not shown in drawings). In this embodiment, the rotating shaft of the motor shaft 611 coincides with the drive axis A1.

A fan 71 is mounted around the drive shaft 66 at the lower side of the bearing 63. Accommodating space for the fan 71 communicates with a dust collecting nozzle 72. The dust collecting nozzle 72 extends from the lower and rear side end of the hosing 20 to the rearward. A hose (not shown in drawings) to be connected to the dust collector (not shown in drawings) can be attached to the dust collecting nozzle 72.

As shown in FIG. 1 to FIG. 4, the tool accessory 30 is disposed at the bottom of the sander 10. The tool accessory 30 is operably connected to the drive shaft 66 and is configured to undergo orbital and/or rotating motion in response to rotation of the drive shaft 66. The tool accessory 30 includes a pad 31, a base 32, clampers 33, 35 and levers 34, 36. Each of the pad 31 and the base 32 has a substantially rectangular shape with a longitudinal direction coinciding with the front-rear direction. The base 32 is disposed on the pad 31 and secured to each other by a bolt extending in the upper-lower direction.

A sandpaper (abrasive paper) (not shown in drawings) is mounted to the pad 31 by utilizing the dampers 33, 35. Specifically, the damper 33 extends along the front edge of the base 32 at the upper region of the base 32. This clamper 33 can be displaced by a manipulation of the lever 34. The clamper 35 extends along the rear edge of the base 32 at the upper region of the base 32. This clamper 35 can be displaced by an operation of the lever 36. The sandpaper is secured to the pad 31 in a state that the sandpaper is disposed at the bottom face of the tool accessory 31 by clamping the front end of the sandpaper between the clamper 33 and the base 32, further by operating the lever 36 and by clamping the rear end of the sandpaper between the clamper 35 and the base 32. The bottom face of the pad 31 functions as a polishing face when the sander 10 is operated.

As shown in FIG. 2, the tool accessory 30 is operably connected to the drive shaft 66 by means of the bearing 64. Specifically, a balancer 65 is fixed around at the lower end of the drive shaft 66. The balancer 65 is fixed to the drive shaft 66 by a bolt engaging with an opening formed at the lower end of the drive shaft 66. The bearing 64 is clamped between the upper region of the balancer 65 and the base 32. Inner ring of the bearing 64 is held by the lower region of the balancer 65. The bearing 64 is disposed eccentrically to the drive shaft 66. The balancer 65 has a shape such that the gravity center of the balancer 65 is biased opposite in the eccentric direction of the bearing 64 to the drive shaft 66. Thus, vibration due to the eccentricity of the bearing 64 to the drive shaft 66 can be restricted.

The tool accessory 30 is also connected to the housing 20 by means of four foots (feet) 73. The foot 73 is provided to restrict the vibration caused by the orbital movement (especially fluttering in the upper-lower direction). In this embodiment, each foot 73 is disposed around at each of four corners of the base 32 having a rectangular shape. The foot 73 has substantially a cylindrical shape extending in the upper-lower direction. The upper end of the foot 73 engages with the housing 20 via the O ring. The lower end of the foot 73 engages with the base 32 via the O ring. The foot 73 is tiltable in the upper-lower direction by squeezing these O rings. The tool accessory 30 undergoes orbital motion around the drive shaft 66 while compressing the O-rings respectively arranged around each foot 73.

The battery mounting portion 40 is disposed at the front side of the handle 22. A battery 50 as an electric power source for the electric motor 61 can be mounted to the battery mounting portion 40 in a sliding manner in the front-rear direction. As shown in FIG. 2, in a state that the battery 50 is mounted to the battery mounting portion 40, the battery 50 is held at the upper region of the tool accessory 30 and the motor shaft 611. In this state, the motor shaft 611 is positioned around at the center of the battery 50 as viewed in the upper-lower direction.

As shown in FIG. 2, a controller 52 is accommodated in the housing 20. In this embodiment, the controller is disposed at the rear side of the motor main body 612 and at the upper side of the dust collecting nozzle 72. The controller 52 is electrically connected to the electric terminal of the battery mounting portion 40 and the electric motor 61. The controller 52 includes various electrical circuits. By controlling the electric power supplied to the electric motor 61 from the battery 50, the controller 52 controls the operation of the electric motor 61. As to the electric circuits, e.g., a protection circuit against the high temperature, a protection circuit against the over current and a protection circuit against the over discharge may be used.

Figure 3:
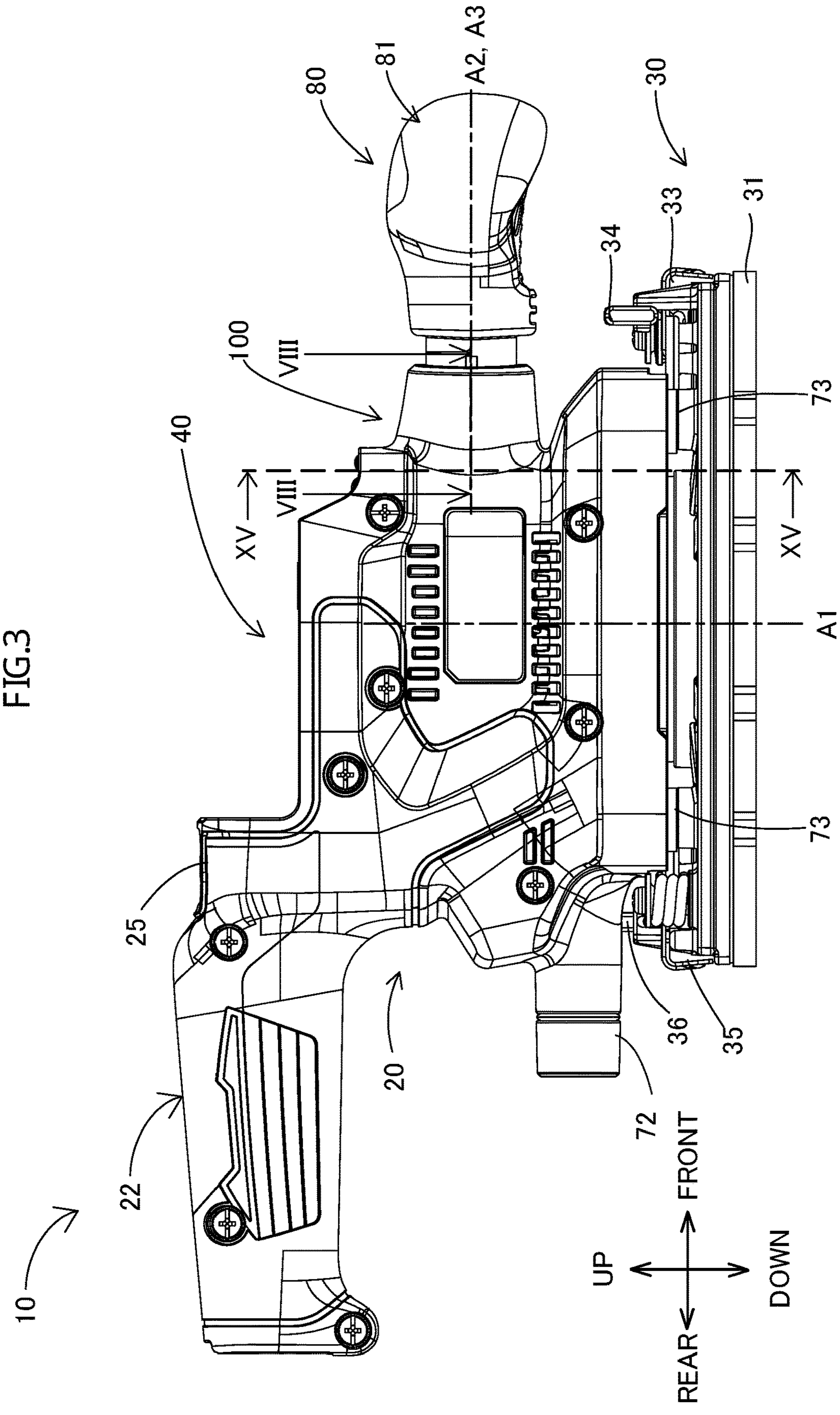
FIG. 3 shows a right-side view of the sander from which the battery is detached.
Figure 4:
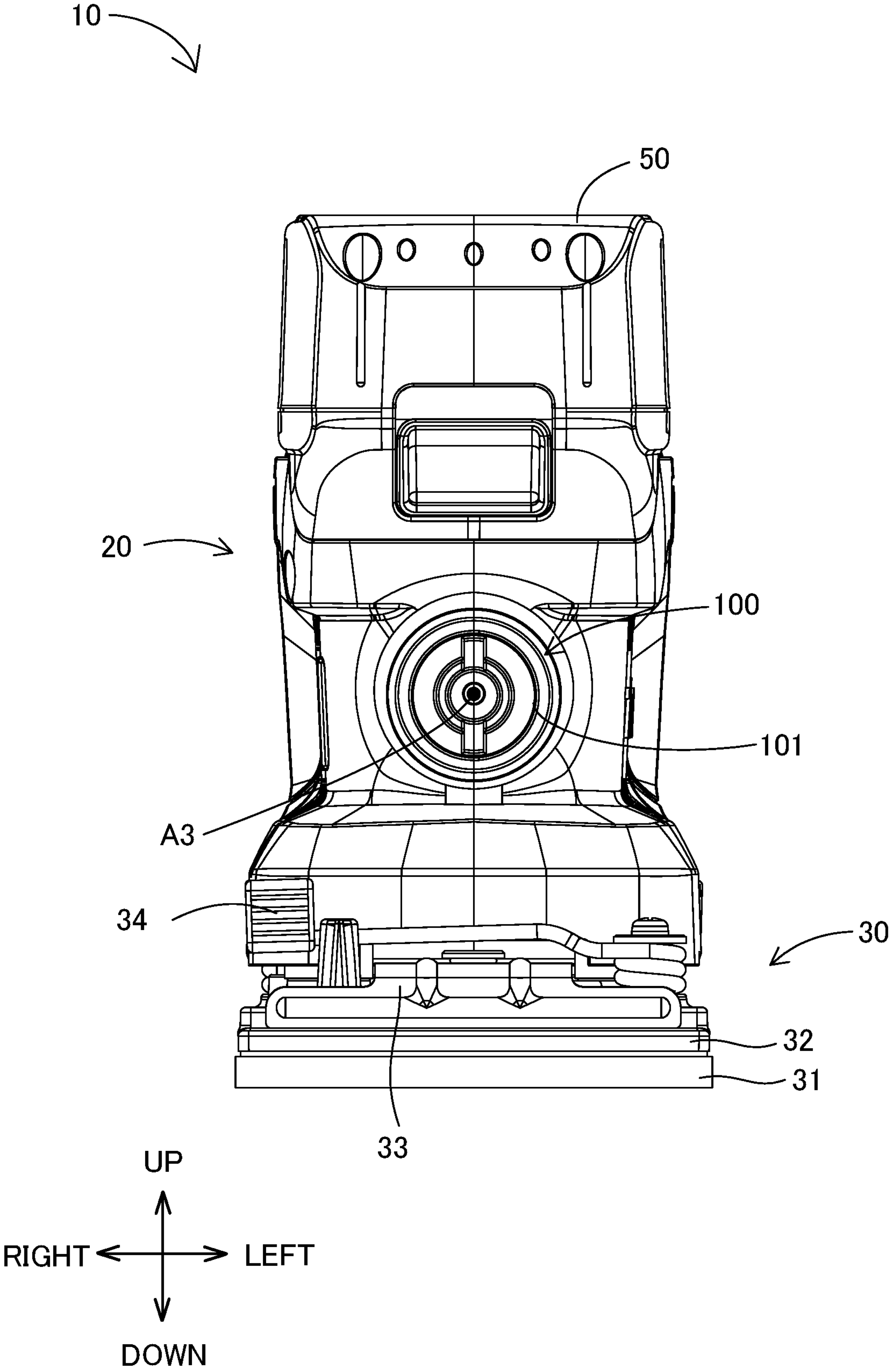
FIG. 4 shows a front view of the sander from which the grip is detached.

As shown from FIG. 1 to FIG. 3, a switch 25 is provided at the upper front end region of the handle 22. The switch is electrically connected to the controller 52. The switch 25 is provided for starting and stopping operations of the electric motor 61.

<Structures of the Grip and the Grip Mounting Portion>

Next, in reference to the drawings from FIG. 5 to FIG. 15, the grip 80 and the grip mounting portion 100 are explained.

Figure 5:
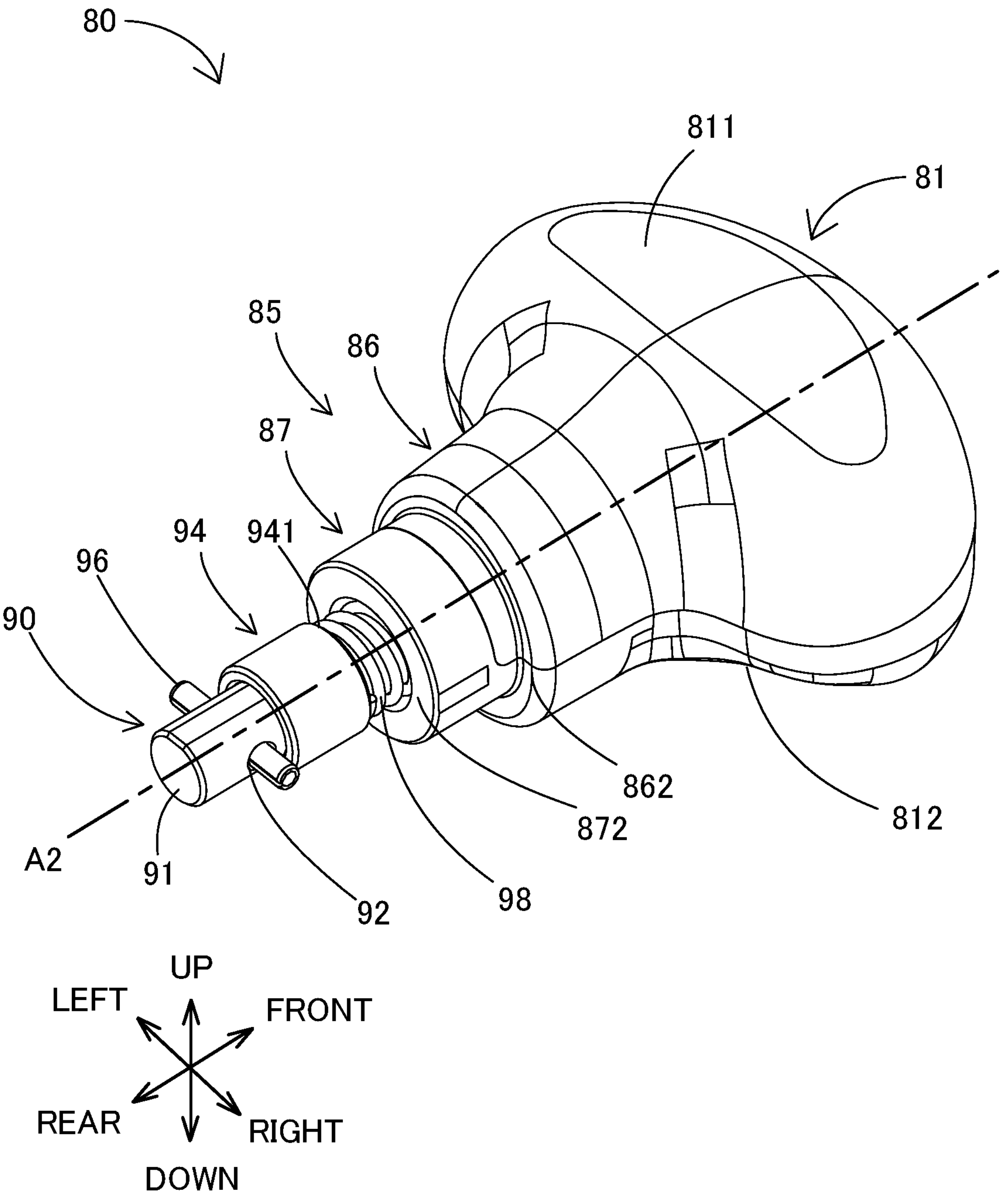
FIG. 5 shows the status in which the first face is positioned at the upper side, while the second face at the lower side.
Figure 6:
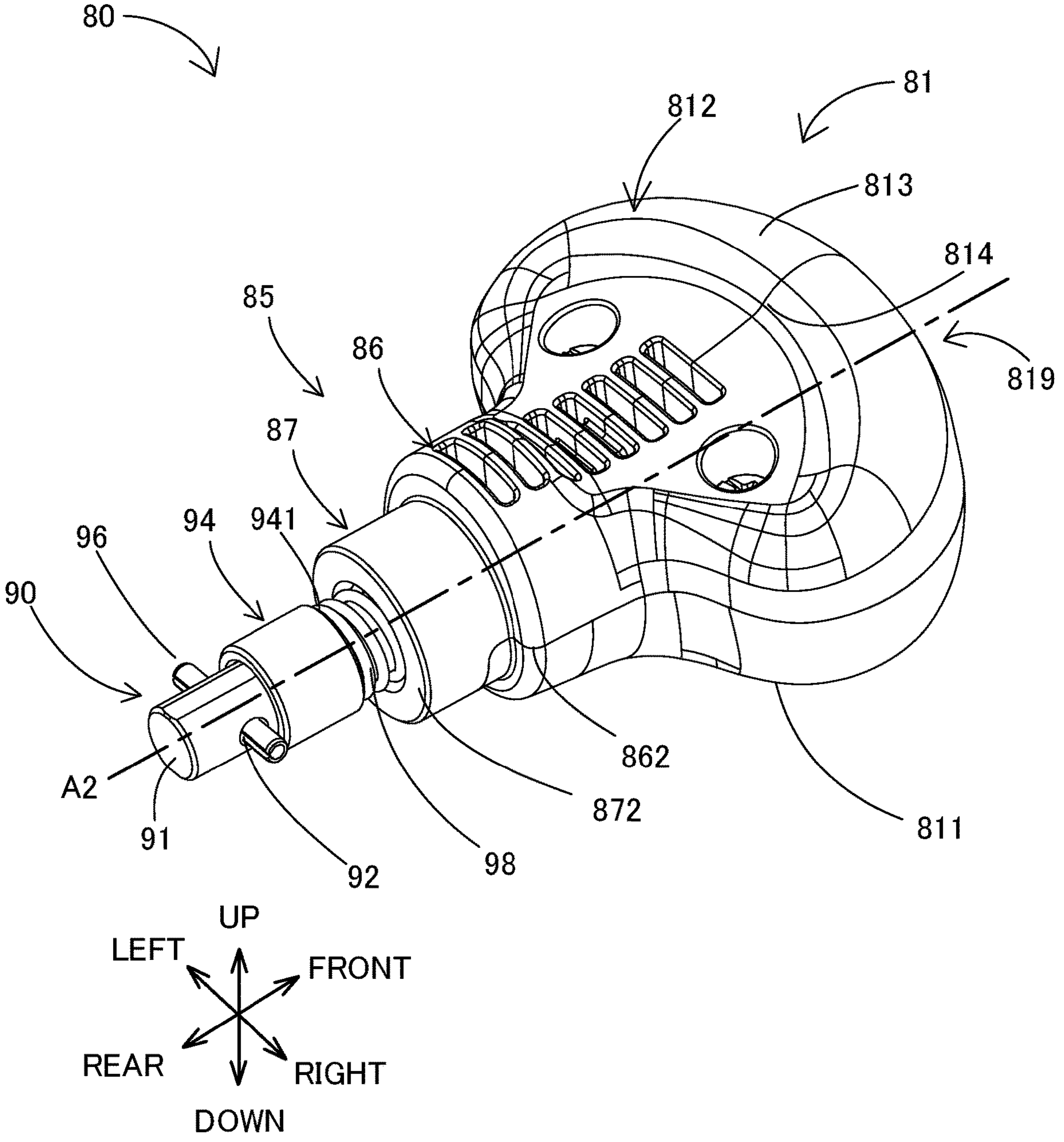
FIG. 6 shows a perspective view of the grip in which the second face is positioned at the upper side, while the first face at the lower side.

First, the structure of the grip 80 is explained. As shown in FIG. 5 and FIG. 6, the grip 80 includes a grip portion 81, a base portion 85 connected to the grip portion 81, a grip shaft 90 projecting from the base portion 85, a sleeve 94, an engaging member 96 and a biasing member 98.

The grip 80 is attachable to the grip mounting portion 100 by switching the rotating angle of the grip shaft 90 around the center axis between the first angle and the second angle different from the first angle.

In this embodiment, the first angle is a standard angle with respect to the rotation of the grip 80. The second angle is the angle in which 180 degrees are added to the first angle (namely, rotated by 180 degrees from the first angle).

Further, the grip 80 is attachable and detachable to the grip mounting portion 100 when the rotating angle is at the third angle different from both the first angel and the second angle. Hereinafter, the center axis of the grip shaft 90 is also called as a rotating axis A2 of the grip 80. The first angle and the second angle can be called as the attaching angle position to mount the grip to the housing 20 and thus, also called as a first angle position, a second angle position, for example.

FIG. 5 and FIG. 6 show the grip 80 wherein the rotating axis A2 extends in the front-rear direction, the grip portion 81 is disposed at the front side and the projecting end 91 of the grip shaft 90 is disposed at the rear side. The grip portion 81 has a size and a shape suitable for user's gripping.

In this embodiment, as viewed the grip portion 81 from the upper side or from the lower side, the grip portion 81 is formed to have an oval shape with a longitudinal axis in the right-left direction. The grip portion 81 has a first surface 811 and a second surface 812 with different shape from the first surface 811 and thus, the grip portion 81 has an asymmetrical shape to the rotating axis A2 as to the rotation.

The grip 80 is, as viewed the grip portion 81 in the direction of the rotating axis A2, the position of the first surface 811 and the position of the second surface 812 around the circumferential direction of the rotating axis A2 when the rotating angle is at the first angle are different from the position of the first surface 811 and the position of the second surface 812 around the circumferential direction of the rotating axis A2 when the rotating angle is at the second angle.

In this embodiment, as shown from FIG. 1 to FIG. 3 and FIG. 5, when the rotating angle is at the first angle, the first surface 811 is positioned at the upper side and the second surface 812 is positioned at the lower side.

When the rotating angle is at the second angle, as shown in FIG. 6, the first surface 811 is positioned at the lower side and the second surface 812 is positioned at the upper side.

The first surface 811 is also the upper end portion of the grip portion 81 when the rotating angle is at the first angle and also the lower end portion of the grip portion 81 when the rotating angle is at the second angle. The second surface 812 is also the lower end portion of the grip portion 81 when the rotating angle is at the first angle and also the upper end portion of the grip portion 81 when the rotating angle is at the second angle.

As shown from Fi. 1 to FIG. 3 and FIG. 5, the first surface 811 is formed smooth. The first surface 811 is formed in flat without unevenness. The first shape 811 is shaped suitable for the user such that the user can wrap and hold the grip portion 81 by user's palm from the position substantially opposing to the first surface 811 (upper side in FIG. 5).

As shown in FIG. 6, the second surface 812 is provided with a projection 813 projecting in the direction apart from the rotating axis A2. In FIG. 6, the projection 813 projects towards upper side. The projection 813 is positioned at the front side portion (the first end portion 819) of the grip portion 81. The first end portion 819 is the remote end portion from the housing 20 in the rotating axis A2 when the grip 80 is attached to the housing 20. As viewed the grip portion 81 from the position opposing to the second surface 812, the projection 813 is formed in a crescent-moon shape such that the side to the housing 20 recesses and the side remote from the housing 20 inflates. Namely, the arch-shaped curving face 814 inside the crescent-moon is positioned at the side of the housing 20

At the rear of the grip portion 81, a tubular base portion 85 connected to the grip portion 81 is provided. As shown from FIG. 10 to FIG. 12, the grip shaft 90 is integrally formed by an insert forming at the inside of the base portion 85 and at the intermediate region in the radial direction of the grip portion 81.

The outer diameter of the base portion 85 is shorter than the length of the grip portion 81 (longitudinal axis of the oval shape) in the right-left direction. The base portion 85 includes a first base portion 86 connected to the grip portion 81 and a second base portion 87 disposed at the rear side of the first base portion 86 to have smaller diameter than the first base portion 86. The first base portion 86 and the second base portion 87 are connected by the connecting face 862 perpendicular to the rotating axis A2. The grip shaft 90 projects from the rear end portion of the second base portion 87. The rear end face 872 of the second base portion 87 defines the opening to which the grip shaft 90 projects. The rear end face 872 crosses the rotating axis A2 at right angles. As shown from FIG. 10 to FIG. 12, the inner diameter of the second base portion 87 is larger than the outer diameter of the grip shaft 90. The biasing member 98 is partly disposed at the inside of the second base portion 87.

The grip shaft 54 is a rod-like member projecting from the base portion 85 to the rearward. The engaging member 96 projects from the grip shaft 90. The engaging member 96 is substantially a rod-like member extending in a direction perpendicular to the rotating axis A2. The engaging member 96 is disposed at the front side over the projecting end 91 of the grip shaft 90. In this embodiment, the engaging member 96 is disposed along in the right-left direction when the rotating angle of the grip 80 is at the first angle and at the second angle. In other words, when the first surface 811 is located at the upper side and the second surface 812 is located at the lower side, or when the second surface 812 is located at the upper side and the first surface 811 is located at the lower side, the extending direction of the engaging member 96 (namely, the projecting direction from the grip shaft 90) coincides with the right-left direction. In this embodiment, a leaf spring is used for the engaging member 96. As shown in FIG. 5 and FIG. 6, the engaging member 96 is fixed by being inserted into the penetrating hole 92 provided at the grip shaft 90. In this embodiment, the length of the engaging member 96 is larger than the outer diameter of the sleeve 94 and is smaller than the outer diameter of the second base portion 87 (see FIG. 5).

The sleeve 94 is a tubular member disposed on the grip shaft 90. The sleeve 94 is disposed on the grip shaft 90 between the engaging member 96 and the base portion 85. The outer diameter of the sleeve 94 is smaller than the diameter of the second base portion 87.

The biasing member 98 is disposed inside the second base portion 87 and on the grip shaft 90. In this embodiment, the biasing member 98 is a compression coil spring. As shown from FIG. 10 to FIG. 12, one end of the biasing member 98 is held by the front end face 941 of the sleeve 94. The other end of the biasing member 98 is held by the support face 871 around the grip shaft 90 at the inside of the second base portion 87. The support face 871 is a face opposing to the front end face 941 of the sleeve so as to cross at right angles with the rotating axis A2.

Then, the grip mounting portion 100 is explained. As described above, the grip mounting portion 100 is provided at the front end of the housing 20. The position of the grip mounting portion 100 in the upper-lower direction is substantially the equal to the position of the motor main body 612. In this embodiment, the grip mounting portion 100 is provided with a hole and a groove to which the grip 80 is insertable from the opening end 101 formed at the front end of the housing 20. In this embodiment, the center axis A3 of the grip mounting portion 100 coincides with the front-rear direction. The center axis A3 coincides with the rotating axis A2 of the grip 80 when the grip 80 is inserted to the grip mounting portion 100.

Figure 7:
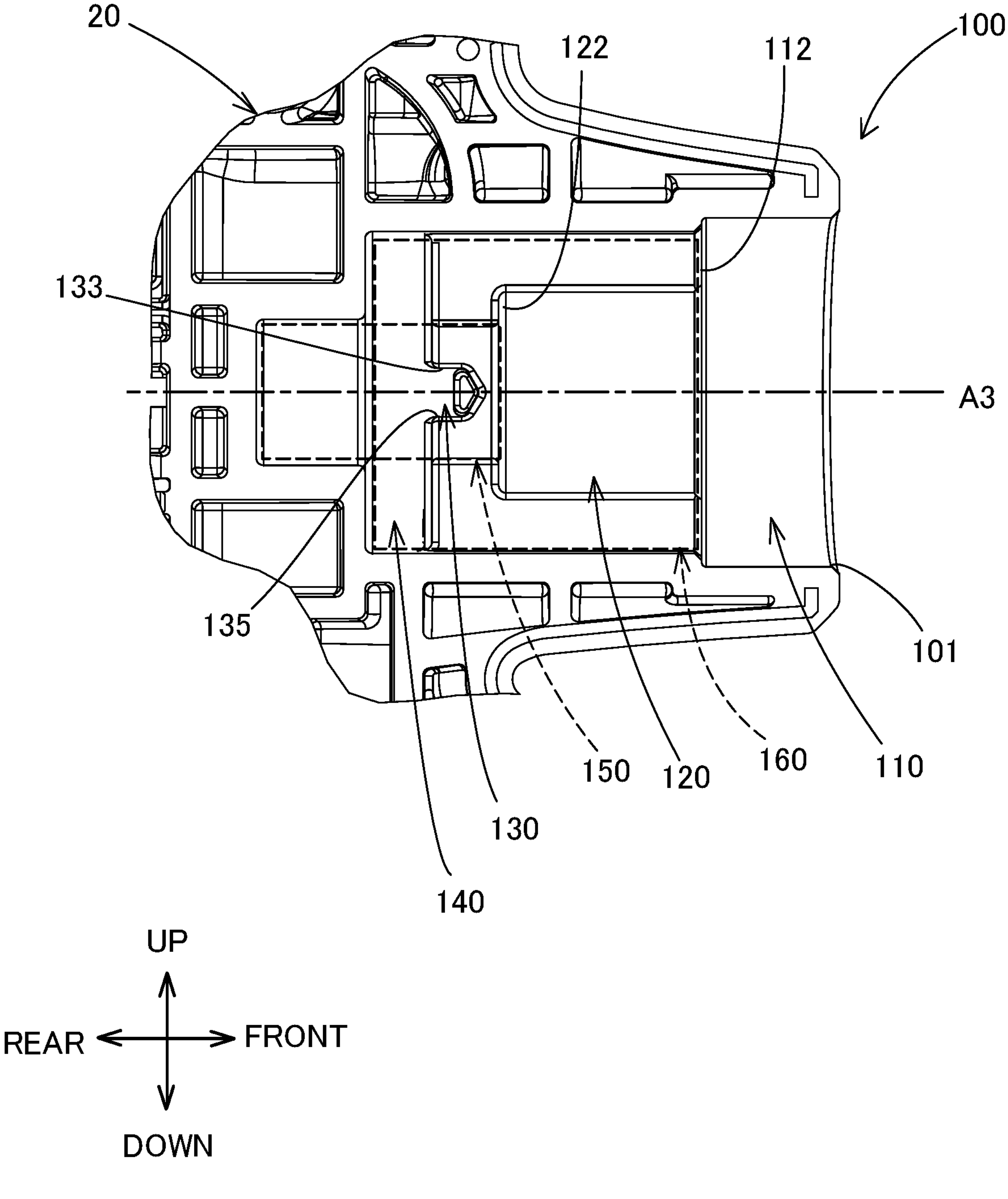
FIG. 7 shows a longitudinal sectional view of the grip mounting portion, as well as a schematic view to show the structure of the grip mounting portion.
Figure 8:
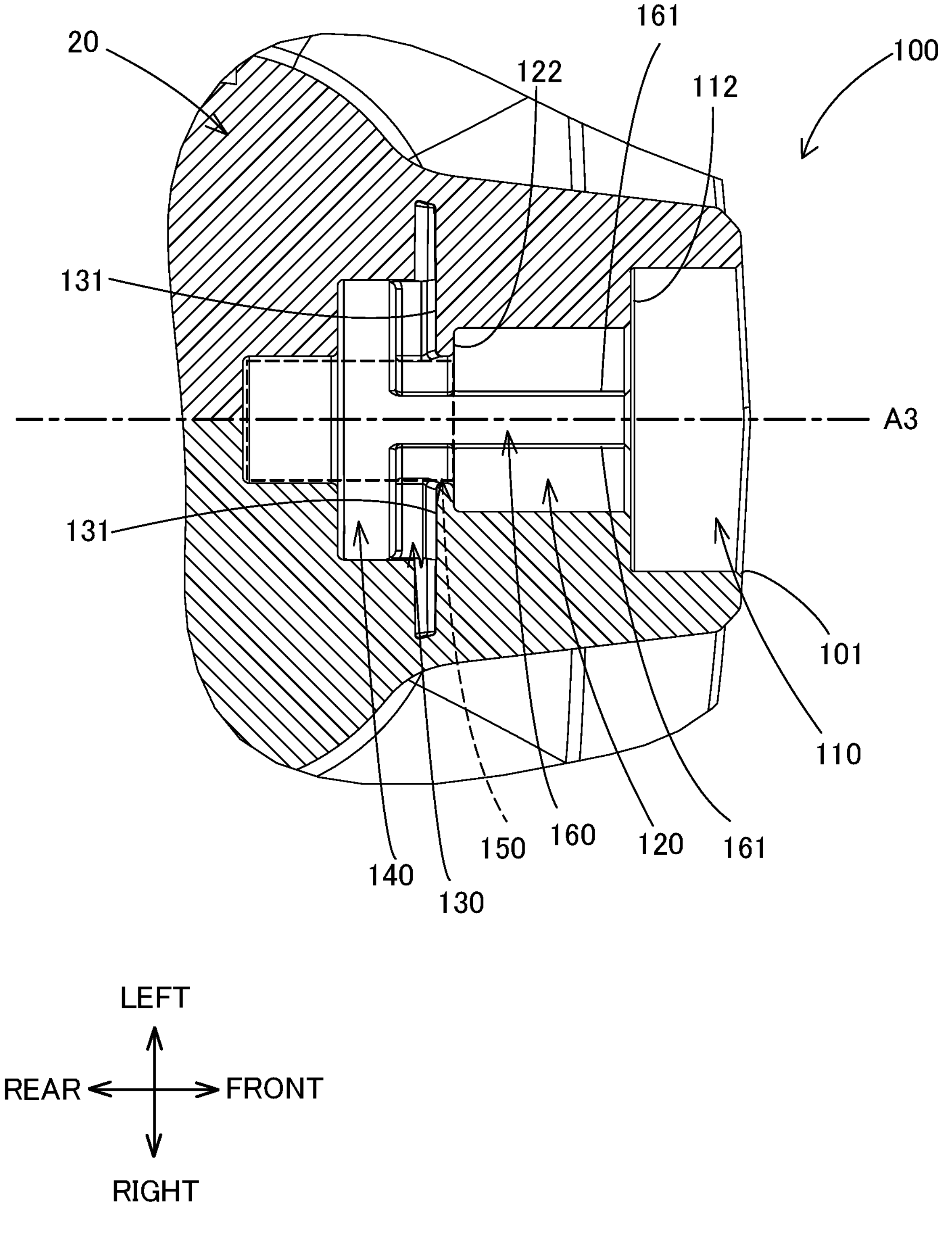
FIG. 8 shows a cross sectional view of the grip mounting portion as viewed by VIII-VIII arrow in FIG. 3.
Figure 9:
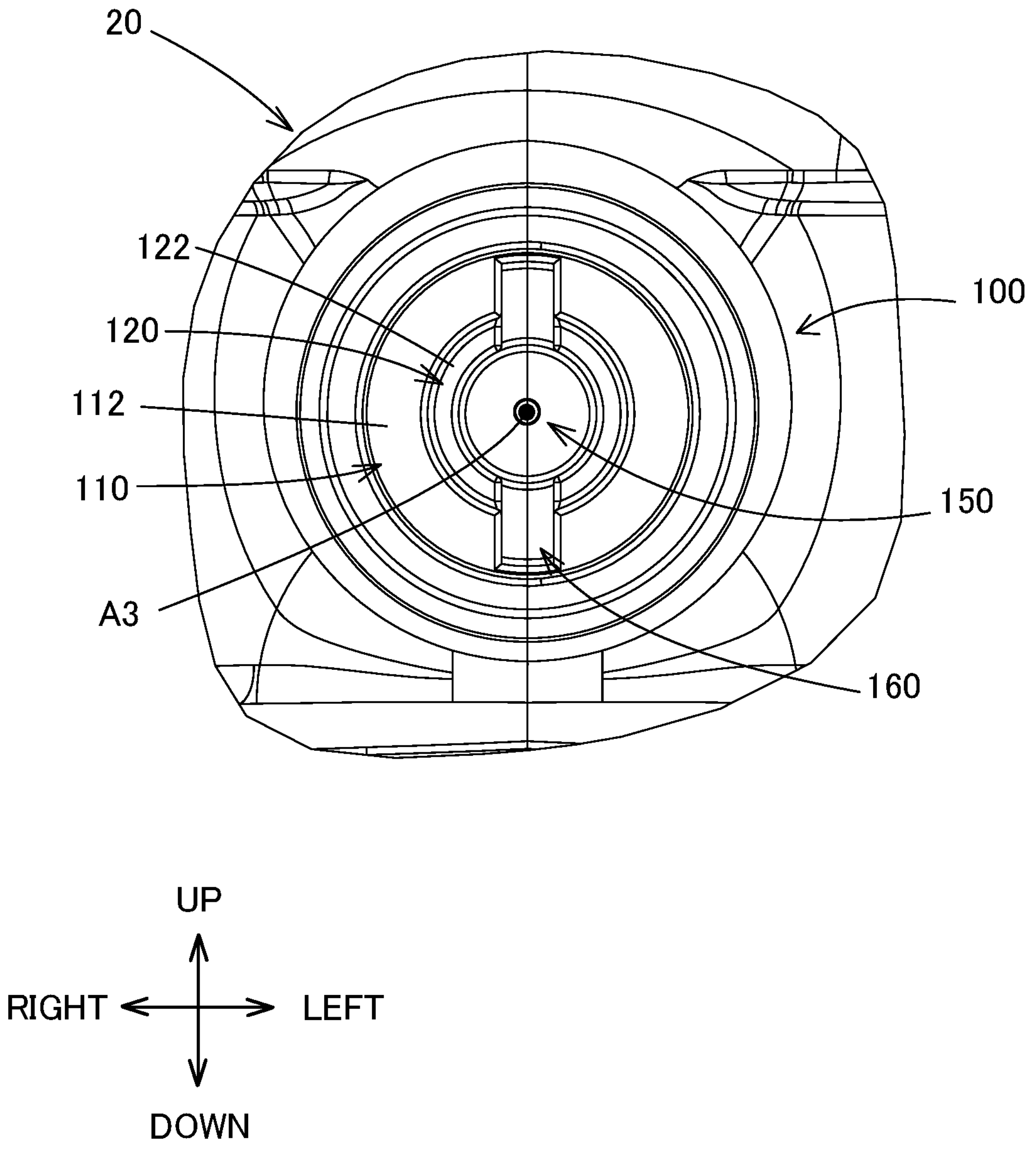
FIG. 9 shows a front view of the grip mounting portion.

As shown in FIG. 7 and FIG. 8, the grip mounting portion 100 includes a base portion insertion part 110, a sleeve insertion part 120, a shaft insertion part 150, a first space 130, a second space 140 and a third space 160. Each center of these parts in the upper-lower direction and in the right-left direction is positioned on the center axis A3. The base portion insertion part 110, the sleeve insertion part 120, the first space 130 and the second space 140 is positioned in this order from the front side to the rear side.

The base portion insertion part 110 is a hole formed at the front end of the grip mounting portion 100. The base portion insertion part 110 has a shape to which the second base portion 87 can be inserted. The inner diameter of the base portion insertion part 110 is larger than the outer diameter of the second base portion 87 and smaller than the outer diameter of the first base portion 86. The rear end face 112 which defines the rear end of the base portion insertion part 110 crosses at the right angle in the front-rear direction. The rear end face 112 restricts the second base portion 87 inserted to the base portion insertion part 110 from moving to the rearward over the rear end face 112.

The sleeve insertion part 120 is a hole formed at the rear of the base portion insertion part 110 by connecting with the base portion insertion part 110. The sleeve insertion part 120 has a shape to which the sleeve 94 can be inserted. The inner diameter of the sleeve insertion part 120 is larger than the outer diameter of the sleeve 94 and smaller than the outer diameter of the second base portion 87. The rear end face 122 which defines the rear end of the sleeve insertion part 120 crosses at the right angle in the front-rear direction. The rear end face 122 restricts the sleeve 94 inserted to the sleeve insertion part 120 from moving to the rearward over the rear end face 122.

Figure 15:
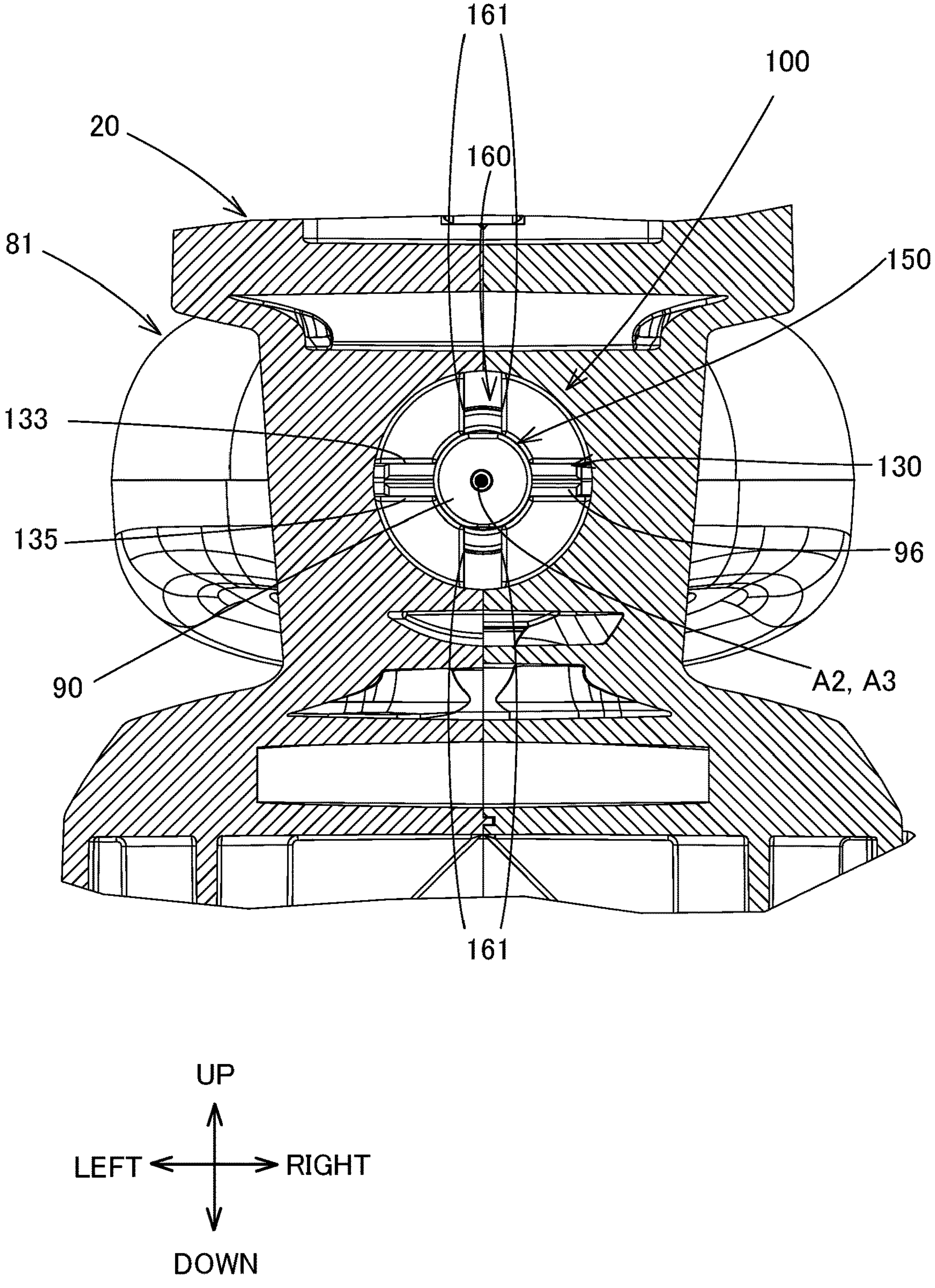
FIG. 15 shows a view as viewed by XV-XV arrow in FIG. 3 in which the rotating angle of the grip is at the first angle, the engaging portion is accommodated in the first space and the grip is attached to the housing.

The first space 130 is provided at the rear of the sleeve insertion part 120. The first space 130 accommodates the engaging member 96 when the rotating angle of the grip 80 is at the first angle and the second angle. Further, the first space 130 is arranged to restrict the engaging member 96 from rotating around the rotating shaft A2. In this embodiment, the first space 130 is provided with a groove in which the engaging member 96 can be disposed along the right-left direction. As shown in FIG. 8, the front end 131 amongst the inner faces of the housing 20 defining the first space 130 contacts with the engaging member 96 disposed at the first space 130 to restrict the engaging member 96 from moving to the forward. As shown in FIG. 7 and FIG. 15, the upper end face 133 and the lower end face 135 amongst the inner faces of the housing 20 defining the first space 130 are in contact with the engaging member 96 disposed at the first space 130 to restrict the engaging member 96 from rotating around the rotating axis A2.

The second space 140 is provided at the rear of the first space 130 to communicate with the first space 130. The second space 140 has a shape to allow the engaging member 96 to rotate around the rotating axis A2. The second space 140 is provided with a hole having an inner diameter to allow the engaging member 96 to rotate around the rotating axis A2 (center axis A3). The engaging member 96 is movable between the second space 140 and the first space 130 in the front-rear direction when the engaging member 96 is disposed along the right-left direction.

The shaft insertion part 150 is an opening to which the grip shaft 90 can be inserted. The shaft insertion part 150 communicates the sleeve insertion part 120 at the rear side of the sleeve insertion part 120. The shaft insertion part 150 is formed to the rear over the second space 140 in the front-rear direction. The inner diameter of the shaft insertion part 150 is smaller than the length (longitudinal axis) of the engaging member 96. With respect to the shaft insertion part 150, the part of the grip shaft 90 at the projecting end 91 side can be inserted to the rear part (right behind part) of the shaft insertion part 150 at the rear of the second space 140 in the front-rear direction.

The third space 160 has shape to allow the engaging member 96 to move in the front-rear direction when the rotating angle of the grip 80 is at the third angle. In this embodiment, the third space 160 is arranged to communicate the base portion insertion part 110 with the second space 140 in the front-rear direction. For this reason, the third space 160 is connected to an outer space of the housing 20 via the base portion insertion part 110. The length of the third space 160 in the upper-lower direction is a length wherein the engaging member 96 can be disposed along the upper-lower direction. For that, the third space 160 allows the engaging member 96 disposed along the upper-lower direction to move between the opening end 101 and the second space 140. As shown in FIG. 8 and FIG. 15, right and left end faces 161, 161 amongst the inner faces of the housing defining the third space 160 are in contact with the engaging member 96 disposed along the upper-lower direction to restrict the engaging member 96 from rotating around the rotating axis A2.

Hereinafter, method of how the grip 80 is mounted to the grip mounting portion, method of how the rotation angle of the grip 80 is switched and method of how the grip 80 is detached from the grip mounting portion 100 are respectively explained.

<A Method of how the Grip is Mounted to the Grip Mounting Portion>

(1) First, the user sets the rotating angle of the grip 80 at the third angle. The third angle is the angle at which the engaging member 96 can be inserted into the third space 160. In this embodiment, the third angle is rotated from the first angle by 90 degrees. The third angle is also the angle at which the projecting direction of the engaging member 96 coincides with the upper-lower direction. Therefore, the user can insert the grip 80 to the grip mounting portion 100 by rotating the grip 80 around the rotating axis A2 such that the first surface 811 is positioned at right side and the second surface 812 is positioned at left side. Otherwise, the user may rotate the grip 80 such that the first surface 811 is positioned at left side and the second surface 812 is positioned at right side.

(2) Then, the user inserts the grip shaft 90 from the opening end 101 of the grip mounting portion 100 into the base portion insertion part 110. As the user pushes the grip 80 (grip portion 81) rearward, the engaging member 96 moves from the front side to the rearward along the third space 160 and the rear end face 942 of the sleeve 94 contacts the rear end face 122 of the sleeve insertion part 120.

Figure 10:
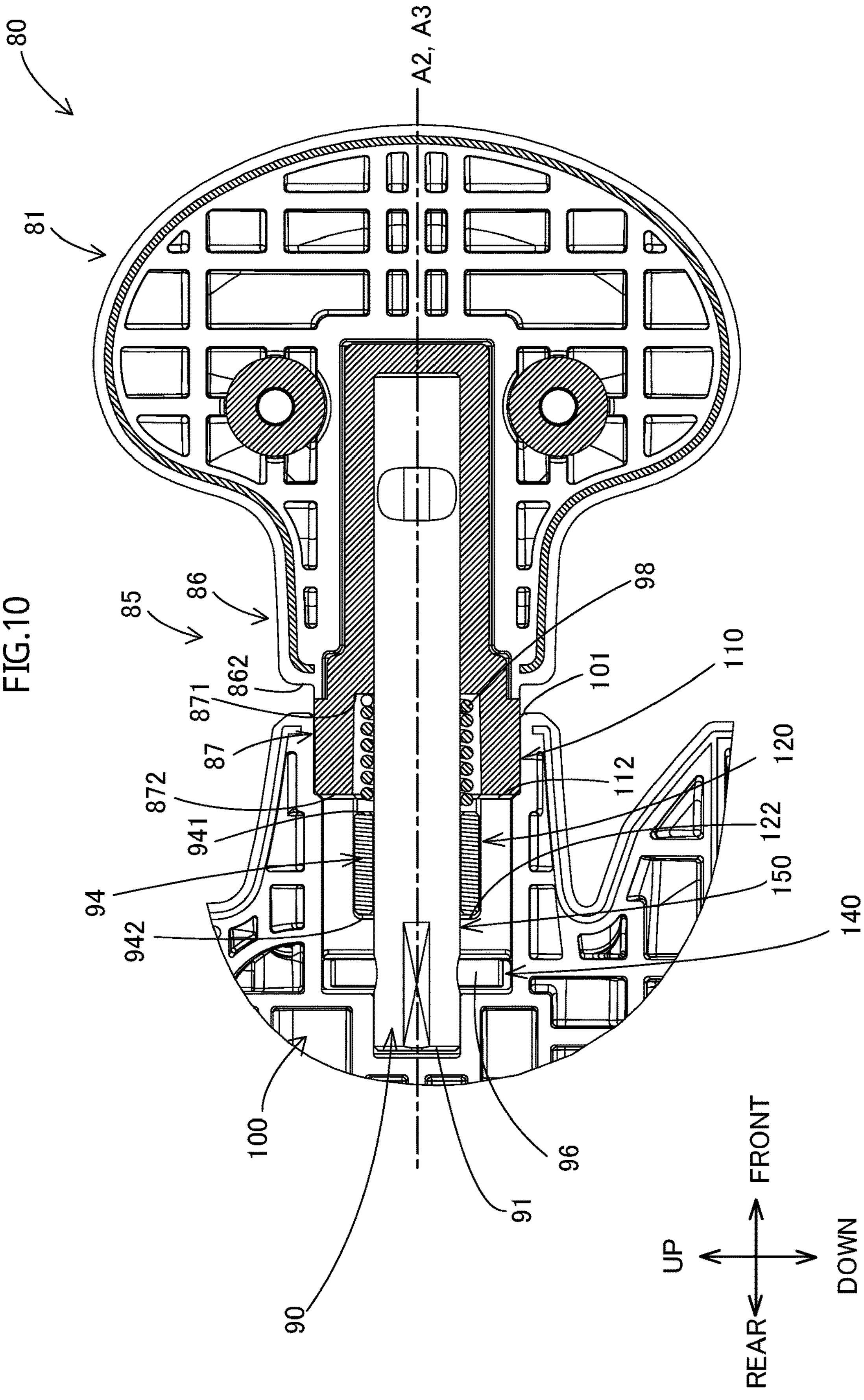
FIG. 10 shows a longitudinal sectional view of the grip and the grip mounting portion in which the rotating angle of the grip is at the third angle and the state that the engaging portion is inserted to the second space.

(3) The user pushes the grip portion 81 further rearward against the biasing force of the biasing member 98. Thus, as shown in FIG. 10, the rear end face 872 of the second base portion 87 contacts with the rear end face 112 of the base portion insertion part 110. The grip shaft 90 slides the inside of the sleeve 94 to the rearward and the projecting end 91 of the grip shaft 90 reaches the rear end portion of the shaft insertion part 150. Thus, the engaging member 96 becomes rotatable around the rotating axis A2 in the second space 140.

Figure 11:
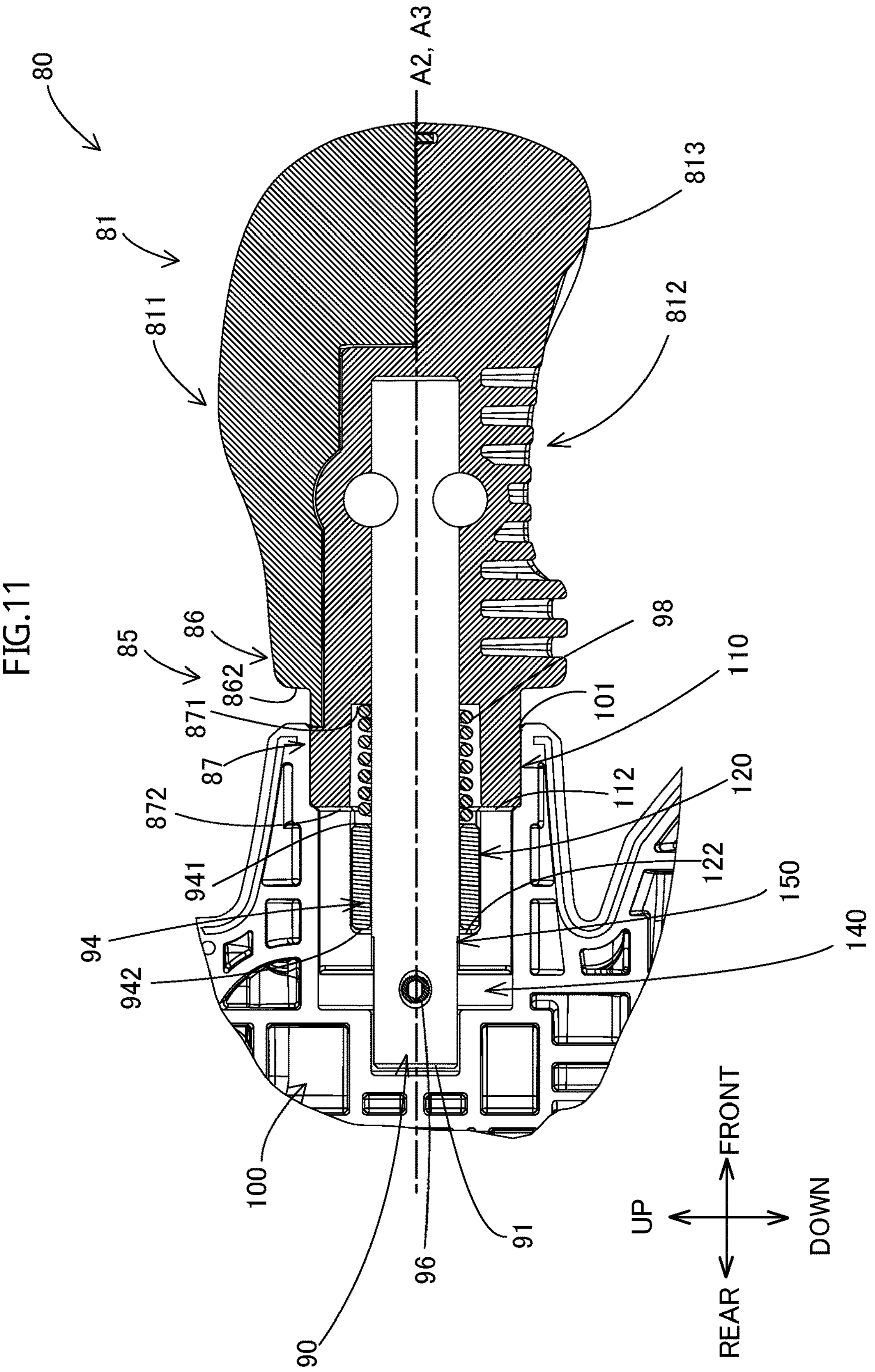
FIG. 11 shows a longitudinal sectional view of the grip and the grip mounting portion in which the rotating angle of the grip is set to the first angle in the second space.
Figure 13:
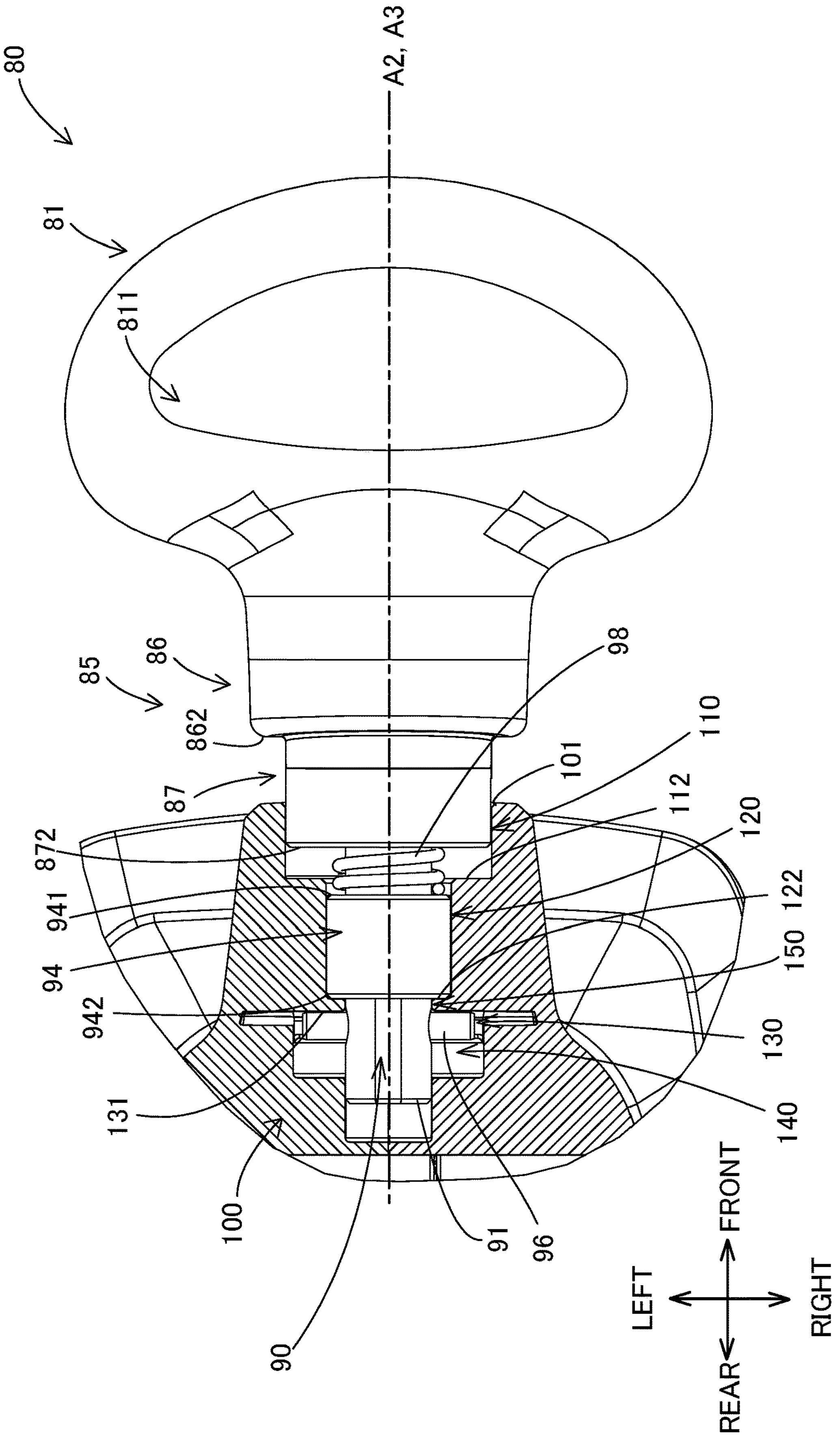
FIG. 13 shows a top view of the grip and a cross sectional view of the grip mounting portion in which the rotating angle of the grip is at the first angle, the engaging portion is accommodated in the first space and the grip is attached to the housing.
Figure 14:
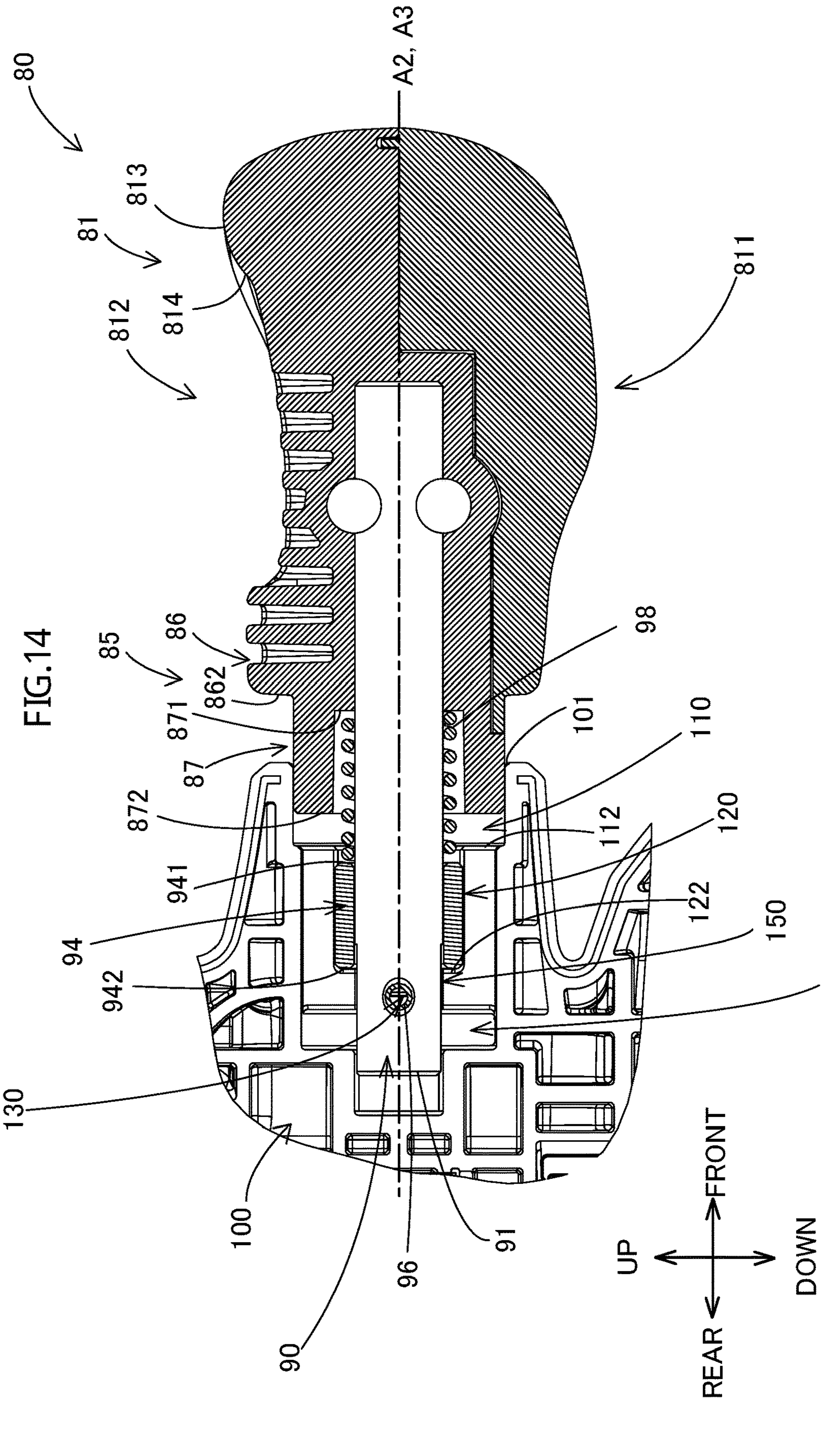
FIG. 14 shows a longitudinal sectional view of the grip and the grip mounting portion in which the rotating angle of the grip is at the second angle, the engaging portion is accommodated in the first space and the grip is attached to the housing.

(4) Next, as shown in FIG. 11, the user sets the rotating angle of the grip 80 at the first angle, as well as pushing the grip portion 81 to the rearward. Namely, the user rotates the grip 80 such that the first face 811 is positioned at the upper side. As a result, the projecting direction of the engaging member 96 coincides with the right-left direction and the engaging member 96 becomes movable from the second space 140 to the first space 130. Namely, when the user rotates the grip 80 such that the first face 811 is positioned at the upper side and cancels the pushing of the grip 80 to the rearward, the engaging member 96 is biased to the forward by the biasing member 98 and moves from the second space 140 to the first space 130. At this time, as shown in FIG. 13, the front end face 131 of the first space 130 contacts with the engaging member 96 and restricts the engaging member 96 from moving forward. Further as shown in FIG. 15, the upper end face 133 and the lower end face 135 of the first space 130 are in contact with the engaging member 96 and restrict the engaging member 96 from rotating around the rotating axis A2. Thus, when the engaging member 96 is accommodated in the first space 130, the engaging member 96 is restricted from moving forward, as well as restricted from rotating around the rotating axis A2. In other words, when the engaging member 96 is accommodated in the first space 130, the grip 80 is restricted from moving to the forward as being restricted from dropping out from the grip mounting portion 100 and the grip 80 is also restricted from rotating around the rotating axis A2. In this state, the biasing member 98 biases the grip shaft 90 and the engaging member 96 to the forward by means of the support face 871 of the second base portion 87 and therefore, the engaging member 96 accommodated in the first space 130 does not move to the second space 140.

<A Method of how the Rotation Angle of the Grip 80 is Switched>

Figure 12:
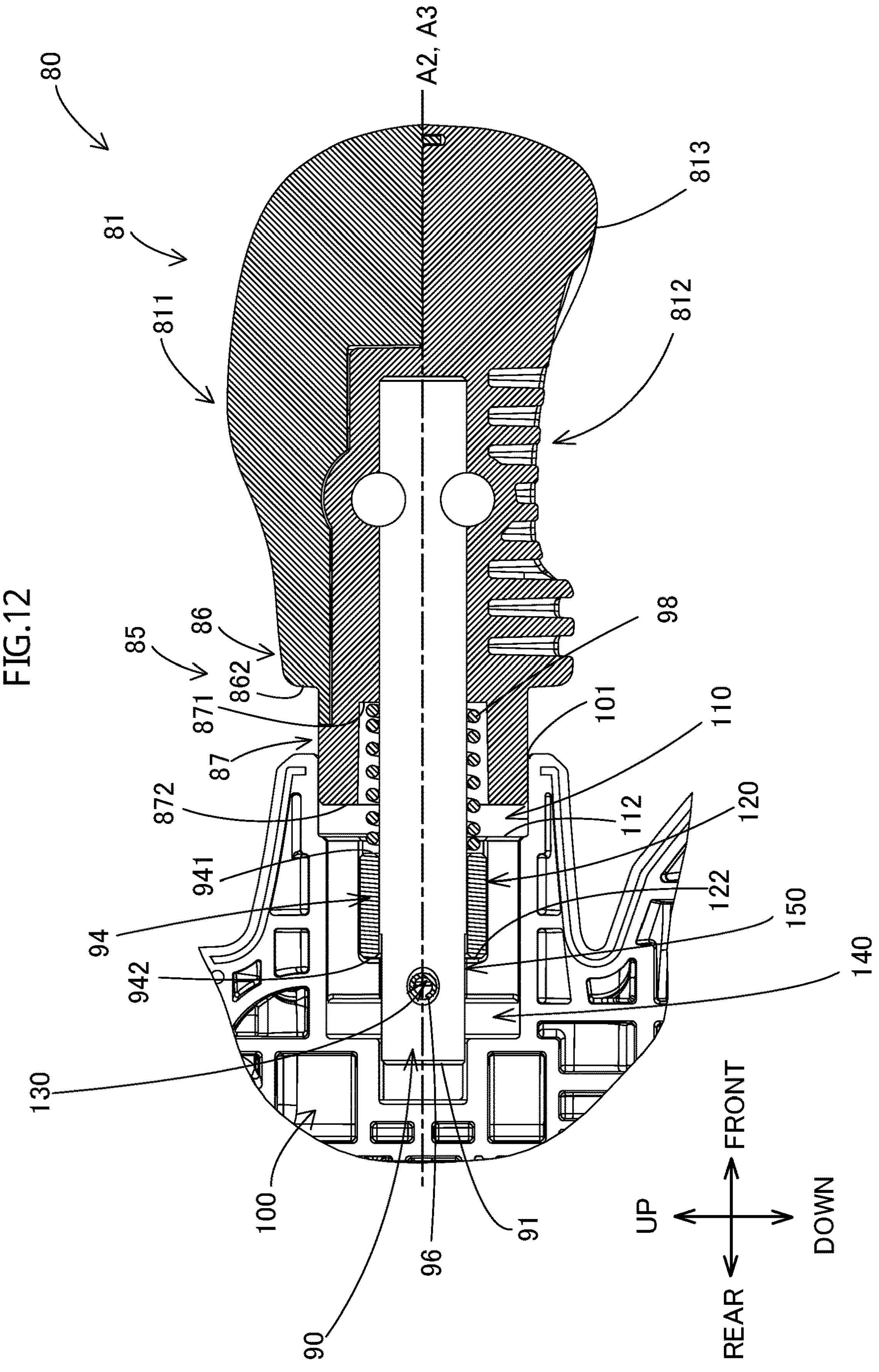
FIG. 12 shows a longitudinal sectional view of the grip and the grip mounting portion in which the rotating angle of the grip is at the first angle, the engaging portion is accommodated in the first space and the grip is attached to the housing.

(5) Next, as shown in FIG. 12 and FIG. 13, a method of how the rotation angle of the grip 80 is switched from the state that the grip 80 is mounted to the grip mounting portion 100 will be explained. When the user pushes the grip portion 81 from the state as shown in FIG. 12 and FIG. 13 against the biasing force of the biasing member 98, the engaging member 96 reaches the second space 140 (see FIG. 11). Resultantly, as the same with the above-described method (3), the engaging portion 96 becomes a state as rotatable around the rotating axis A2.

(6) As same with the above-described method (4), the user sets the rotating angle of the grip 80 at the second angle (180 degrees) by pushing the engaging portion 81 to the rearward. Namely, the user rotates the grip 80 by 180 degrees such that the second surface 812 is positioned at the upper side. Thus, as the same with the above-described method (4), the engaging member 96 becomes a state as movable from the second space 140 to the first space 130. Namely, the user rotates the grip 80 such that the second surface 812 is positioned at the upper side and releases the pushing of the grip 80 to the rearward. Thus, the engaging member 96 moves from the second space 140 to the first space 130. At this time, the front end face 131 of the first space 130 restricts the engaging member 96 from moving forward (see FIG. 14). Further, the upper end face 133 and the lower end face 135 of the first space 130 restrict the engaging member 96 around the rotating axis A2. Thus, the user can switch the rotating angle of the grip 80.

Note that in the above-described (4), the user may set the rotating angle of the grip 80 at the second degree (180 degrees) and in the above-described (6), the user may set the rotating angle of the grip 80 at the first degree (0 degree)

<A Method of how the Grip is Detached from the Grip Mounting Portion>

(7) Next, a method of how the grip 80 is detached from the grip mounting portion will be explained. For example, the user further pushes the grip portion 81 from the state as shown in FIG. 12 against the biasing force of the biasing member 98 and then, the engaging member 96 reaches the second space 140 (see FIG. 11). Resultantly, as the same with the above-described (3), (5), the engaging member 96 becomes a state as rotatable around the rotating axis A2.

(8) The user sets the rotating angle of the grip 80 at the third angle (90 degrees). Namely, the user rotates the grip 80 such that the first surface 811 is located at the right side and the second surface 812 is located at the left side. Otherwise, the user rotates the grip 80 such that the first surface 811 is located at the left side and the second surface 812 is located at the right side. As a result, the projecting direction of the engaging member 96 coincides with the upper-lower direction, the engaging member 96 reaches the base portion insertion part 110 from the second space 140 along the third space 160 and the engaging member 96 becomes movable to the opening end 101. Thus, the user can detach the grip 80 from the grip mounting portion 100.

<Effect>

According to the above-described sander 10, the grip 80 includes a grip portion 81 having a first surface 811 and a second surface 812 with different shape from the first surface 811 such that the grip portion 81 is formed in a rotation asymmetric shape to the rotating axis A2. The grip 80 is attachable to the housing 20 by switching the rotating angle around the rotating axis A2 between a first angle and a second angle different from the first angle.

And when the grip 80 is viewed in the extending direction of the rotating axis A2, the position of the first surface 811 and the position of the second surface 812 in the circumferential direction around the rotating axis A2 in a case that the rotating angle is at the first angle are different from the position of the first surface 811 and the position of the second surface 812 in the circumferential direction around the rotating axis A2 in a case that the rotating angle is at the second angle.

Therefore, by switching the rotating angle of the grip 80 between the first angle and the second angle, user can change the position where the first surface 811 is presented and position where the second surface 812 is presented.

Thus, in accordance with the working aspects, the mounting style of the grip 80 (grip portion 81) to the housing 20 can be switched. As a result, operability of the portable power tool is enhanced.

The grip 80 is arranged that, when the rotation angle is at the first angle, the first surface 811 is positioned at the upper side and the second surface 812 is positioned at the lower side. Further, the grip 80 is arranged that, when the rotation angle is at the second angle, the second surface 812 is positioned at the upper side and the first surface 811 is positioned at the lower side.

Therefore, by inverting the grip 80 around the rotating axis A2, the surface shape presented at the upper side and the lower side can be switched from the first surface 811 to the second surface 812, or from the second surface 812 to the first surface 811. Thus, the user can intuitively switch the surface shape presented at the upper side and the lower side.

Further, the second surface 812 is provided with a projection 813 at the remote side end from the housing 20 in the rotating axis A2 such that the projection 813 projects in the direction to depart from the rotating axis A2. Therefore, the user can grip the grip portion 81 by engaging fingers with the projection 813 of the second surface 813. Thus, in comparison with the case without the projection 813, the user can easily perform the processing operation.

Further, when the rotating angle of the grip 80 is at the first angle, the second surface 812 is positioned at the lower side and the projection 813 of the second surface 812 projects to the lower side. Therefore, the user can easily engage fingers with the projection 813. Thus, the operability of the sander 10 is enhanced.

When the grip portion 81 is viewed from the position opposing to the second surface 812, the projection 813 is formed in a crescent-moon shape such that the housing side of the projection 813 recesses and the side remote from the housing 20 inflates. Therefore, when the second surface 912 is positioned at the upper side, the user can perform the processing operation on a workpiece or surface such as sanding, abrading, polishing or grinding by pushing the palm to the second surface 812 following the palm edge along the projection 813. Thus, the grip 80 can be held in various styles.

For example, in a finishing step in the processing operation, the work is done by reducing the pushing force to the sander 19 to the downward in comparison with the initial steps. In such case, the user applies appropriate force to the downward following the palm edge along the arch-shaped curving face 814 of the projection 813 and then, moves the palm edge to the desired direction and thus, the user can perform the processing operation by moving the sander 10 to the desired direction.

Further, the first surface 811 is formed smooth and the grip portion 81 is formed in oval shape having a longitudinal axis in a direction crossing the rotating axis A2. Therefore, for example, the user may wrap the first surface 811 by the palm and can easily hold the grip portion 81.

Further, the grip 80 is arranged that, when the rotating angle is at the first angle, the first surface 811 is positioned at the upper side and the first surface 811 is formed smooth. Therefore, the user can easily push the sander 10 to the downward for processing operation.

Further, in the sander 10, the grip 80 is provided at the front end of the housing 20 and the handle 22 is provided at the rear end of the housing 20 such that the handle 22 extends in the front-rear direction. Therefore, the user can perform the processing operation gripping the handle 22 by one hand and holding the grip portion 81 by another hand so as to push the sander 10 to the downward. Further, by moving the grip 80 to the desired direction, the user can move the sander 10 to perform the processing operation.

Moreover, the housing 20 includes the grip mounting portion 100 having the first space 130 and the second space 140.

The first space 130 accommodates the engaging member 96 such that the rotating angle of the grip 80 is at the first angle and the second angle to restrict the engaging member 96 from rotating around the rotating axis A2.

The second space 140 is provided at the rear of the first space 130 communicating with the first space 130 so as to allow the engaging member 96 to rotate. Therefore, the user moves the engaging member 96 accommodated in the first space 130 to the rearward and rotates in the second space 140. As a result, the rotating angle of the grip 80 is switched from the first angle to the second angle, or from the second angle to the first angle and the grip 80 can be secured to the housing 20.

Further, the grip mounting portion 100 includes the third space 160 in which the engaging member 96 can move in the front-rear direction from the opening end 101 to the second space 140.

The third space 160 is arranged to allow the engaging member 96 to move in the front-rear direction when the rotating angle of the grip 80 is at the third angle different from the first angle and the second angle.

For this aspect, the user sets the rotating angle of the grip 80 at the third angle, inserts the grip 80 from the opening end 101 of the grip mounting portion 100, rotates the rotating angle of the grip 80 to the first angle or to the second angle thereby accommodating the engaging member 96 in the first space 130. As a result, the grip 80 can be attached to the grip mounting portion 100.

Further, the engaging member 96 accommodated in the first space 130 is rotated in the second space 140 and moved to the forward along the third space 160, the grip 80 can be detached from the grip mounting portion 100.

According to the sander 10, the grip 80 can be attached and detached to the grip mounting portion 100 by utilizing the structure of the grip 80 and the housing 20 as itself. Therefore, no special accessory is required for mounting the grip 80 to the housing and thus, convenience of the sander 10 is enhanced.

Further, the grip 80 is mounted to the grip mounting portion 100 formed as the hole and the groove at the housing 20. Therefore, the connecting region of the grip 80 with the housing 20 is not reachable by user's hand during the processing operation. Thus, the grip 80 can be restricted from inadvertently dropping from the housing 20 out.

Further, the user can attach the grip 80 to the housing 20 by reaching the engaging member 96 of the grip 80 to the second space 140 along the third space 160, by rotating the engaging member 96 to the first angle or to the second angle in the second space 140 and accommodating in (engaging with) the first space 130.

Further, the user can detach the grip 80 from the grip mounting portion 100 by moving the engaging member 96 engaged at the first space 130 to the second space 140 to rotate to the third angle and to move to the opening end 101 along the third space 160.

Therefore, according to this structure, for example, the groove formed in the circumferential direction of the shaft can be screwed to the screw hole of the housing and as a result, the grip 80 can be easily attached and detached in comparison with the conventional structures.

<Correspondence>

The correspondences between the features of above-described embodiment and the features of this disclosure are as follows. Nevertheless, the features of the embodiment are only example and do not limit the features of this disclosure.

The sander 10 is an example of "portable power tool".

The tool accessory 30 is an example of "tool accessory".

The drive shaft 66 is an example of "drive shaft".

One end 661 of the drive shaft 66 is an example of "one end of the drive shaft".

The drive mechanism 60 and the electric motor 61 are respectively examples of "drive mechanism".

The housing 20 and the grip mounting portion 100 are respectively examples of "housing".

The grip 80 is an example of "grip".

The first surface 811 and the second surface 812 are respectively examples of "first surface" and "second surface".

The rotating axis A2 is an example of "rotating axis".

The grip portion 81 is an example of "grip portion".

The first end portion 819 is an example of "end portion remote from the housing".

The projection 813 is an example of "projection".

The grip shaft 90 is an example of "shaft".

The engaging member 96 is an example of "engaging member".

The biasing member 98 is an example of "biasing member".

The first space 130 and the second space 140 are respectively examples of "first space" and "second space".

The upper end face 133, the lower end face 135 and the front end face 131 are respectively examples of "inner face forming the first space".

The front end face 131 is an example of "inner face of the first direction side" of "inner face forming the first space".

The third space 160 is an example of "third space".

The end face 161 of the third space 160 is an example of "inner face forming the third space".

The rear direction is an example of "first direction". The front direction is an example of "second direction".

<Another Embodiment>

In the above-described embodiment, the first angle is the standard angle (0 degree), the second angle is the angle rotated by 180 degrees from the first angle (180 degrees) and the third angle is the angle rotated by 90 degrees from the first angle. These are only example and rather, the first angle, the second angle and the third angle may respectively be defined by other angles.

Further, in the above-described embodiment, when at the first angle, the first surface 811 is located at the upper side and the second surface 812 is located at the lower side. In this connection, when at the first angle, the first surface 811 may be located at any other position other than the upper-side around the circumferential direction, such like right-side, left-side and so on. As with the same, the second surface 812 may be located at any other position other than the lower-side.

The second angle may preferably include a plurality of angles. For example, the first space 130 may preferably accommodate the engaging member at a plurality of angles such like 30 degrees, 60 degrees and 180 degrees, not limited to right and left directions.

In the above-described embodiment, the grip mounting portion 100 may not include the third space 160 and the grip 80 may not be detachable from the housing. In this case, the sander 10 may be provided such that the engaging member 96 is disposed in advance between the first space 130 and the second space 140.

In the above-described embodiment, the drive axis A1 coincides with the rotating axis of the motor shaft 611. In this connection, the drive axis A1 is not required to coincide with the rotating axis of the motor shaft 611. For example, the motor shaft 611 is not required to be disposed in the front-rear direction. The drive mechanism 60 may include a spindle and may transmit the rotating power of the motor shaft 611 to the spindle. In this case, the drive axis A1 may be the center axis of the spindle (drive shaft).

In the above-described embodiment, the grip 80 is disposed at the front end of the housing 20 but also may be disposed at any other region. For example, grip 80 may be disposed at the left or right wall of the housing 20. Further, for example, grip mounting portion 100 may be provided with a clamp-type as attachable to any position around the side wall of the housing 20 and then, the grip 80 may be secured at any arbitrary position around the side wall of the hosing 80. In this case, the grip mounting portion as a clamp type may be deemed to be the housing of the portable power tool.

The sander 10 is driven by the chargeable battery 50 but also may be driven by electrical supply from external AC source by means of an electrical cable.

The above-described embodiment is not limited to the orbital sander but also applicable to a random orbit sander, polisher and so on.

This disclosure is not limited to the above-described embodiment and can be exploited by various structures without escaping the scope of its spirits. For example, the technical characters within the embodiment corresponding to the technical characters of the representative embodiments within the summary of the invention can be appropriately replaced and/or combined in order to achieve the above-described object in part or entirely. Further, if the technical character(s) is (are) not described in this specification as essential, it can appropriately be deleted.

DESCRIPTION OF THE REFERENCE NUMERALS

10: sander, 20: housing, 22: handle, 25: switch, 30: tool accessory, 31: pad, 32: base, 33: clamper, 34: lever, 35: clamper, 35: lever, 40: battery mounting portion, 50: battery, 52: controller, 60: drive mechanism, 61: electric motor, 62: bearing, 63: bearing, 64: bearing, 65: balancer, 66: drive shaft, 71: fan, 72: dust collecting nozzle, 73: foot, 80: grip, 81: grip portion, 85: base portion, 86: first base portion, 87: second base portion, 90: grip shaft, 91: projecting end, 92: penetrating hole, 94: sleeve, 96: engaging member, 98: biasing member, 100: grip mounting portion, 101: opening end, 110: base portion insertion part, 112: rear end face, 120: sleeve insertion part, 122: rear end face, 130: first space, 131: front end face, 133: upper end face, 135: lower end face, 140: second space, 150: shaft insertion part, 160: third space, 161: end face, 611: motor shaft, 612: motor main body, 661: one end of the drive shaft, 811: first surface, 812: second surface, 813: projection, 814: arch-shaped curving face, 819: first end portion, 862: connecting face, 871: support face, 872: rear end face, 941: front end face, A1: drive axis, A2: grip rotating axis, A3: grip center axis

The invention claimed is:

1. A portable power tool comprising:

a drive mechanism that is configured to drive a tool accessory in an orbital and/or rotational motion;

a housing that houses the drive mechanism; and a grip that includes (i) a grip portion configured to be gripped by a user of the portable power tool, (ii) a rod (a) projecting from the grip portion and (b) having a longitudinal center axis in a front-rear direction, and (iii) an engaging portion (a) integral with the rod such that the rod and the engaging portion move as a single unit and (b) projecting from the rod in a direction crossing the longitudinal center axis, wherein:

the grip is connected to the housing such that the grip is rotatable around the longitudinal center axis between a first angle and a second angle relative to the housing;

the housing includes (i) a first internal surface that defines a first internal space in the housing and (ii) a second internal surface that defines a second internal space in the housing;

the second internal space is (i) rearward of the first internal space and (ii) in direct communication with the first internal space; and the grip and the housing are configured such that (i) the engaging portion is movable in the front-rear direction in the first internal space and the second internal space, (ii) the grip is held at the first angle or the second angle and cannot be rotated relative to the housing when the engaging portion is in the first internal space, and (iii) the grip is freely rotatable relative to the housing when the engaging portion is in the second internal space.

2. The portable power tool according to claim 1, wherein:

the drive mechanism includes a drive shaft (i) having one end that is configured to be operably connected to the tool accessory and (ii) having a drive shaft longitudinal axis in an up-down direction;

the grip portion has a first exterior surface and a second exterior surface with a different shape than the first exterior surface; and the housing and the grip are configured such that, when the grip is at the first angle, the first exterior surface is an upper side of the grip in the up-down direction and the second exterior surface is a lower side of the grip in the up-down direction.

3. The portable power tool according to claim 1, wherein:

the drive mechanism includes a drive shaft (i) having one end that is configured to be operably connected to the tool accessory and (ii) having a drive shaft longitudinal axis in an up-down direction;

the grip portion has a first exterior surface and a second exterior surface with a different shape than the first exterior surface; and the housing and the grip are configured such that, when the grip is at the second angle, the second exterior surface is an upper side of the grip in the up-down direction and the first exterior surface is a lower side of the grip in the up-down direction.

4. The portable power tool according to claim 2, wherein the second exterior surface has a projection at an end of the grip opposite the housing that projects outwardly from the longitudinal center axis.

5. The portable power tool according to claim 4, wherein the projection, when the grip portion is viewed from a direction orthogonal to the second exterior surface, has a crescent-moon shape that is inclined outwardly toward the end of the grip opposite the housing.

6. The portable power tool according to claim 2, wherein the first exterior surface is smooth and the grip portion has an oval shape having a longitudinal axis in a direction crossing the drive shaft longitudinal axis when the grip portion is viewed from a position opposing to the first exterior surface.

7. The portable power tool according to claim 1, wherein the first internal surface restricts the engaging portion from moving from the first internal space toward the grip portion by contact of the engaging portion with the first internal surface.

8. The portable power tool according to claim 7, wherein:

the housing includes a third internal surface defining a third internal space in the housing; and the third internal surface is configured such that, when the grip is at a third angle relative to the housing that is different from the first angle and the second angle and the engaging portion is in the third internal space, the engaging portion is movable along the longitudinal center axis but the third internal surface restricts the rotating of the engaging portion around the longitudinal center axis by the contact of the third internal surface and the engaging portion.

9. The portable power tool according to claim 7, wherein the grip includes a biasing member which biases the engaging portion toward the grip portion.

10. The portable power tool according to claim 2, wherein the housing and the grip are configured such that, when the grip is at the second angle, the second exterior surface is the upper side of the grip and the first exterior surface is the lower side of the grip.

11. The portable power tool according to claim 1, wherein the first internal surface and the second internal surface are configured such that the longitudinal center axis of the rod is co-axial with a longitudinal center axis of the first internal space in the front-rear direction and a longitudinal center axis of the second internal space in the front-rear direction.

12. The portable power tool according to claim 1, wherein:

the engaging portion is a cylindrical rod having ends outward from the rod.

13. The portable power tool according to claim 1, wherein:

the grip includes a sleeve and a biasing member within the sleeve;

the biasing member extends between a sleeve internal surface of the sleeve at a first end of the biasing member and a rod surface of the rod at a second end of the biasing member; and the grip and the housing are configured such that a user must overcome a biasing force of the biasing member to move the engaging portion from the first internal space to the second internal space.

14. A portable power tool comprising:

a drive mechanism that is configured to drive a tool accessory in an orbital and/or rotational motion;

a housing that houses the drive mechanism; and a grip (i) rotatable around a rotating axis relative to the housing, (ii) attachable to the housing at least at a first angle relative to the housing around the rotating axis, and (iii) that includes (a) a grip portion configured to be gripped by a user of the portable power tool, (b) a rod projecting from the grip portion along the rotating axis and (c) an engaging portion (i) projecting from the rod in a direction crossing the rotating axis and (ii) integral with the rod such that the rod and the engaging portion move as a single unit, wherein:

the housing comprises:

a first internal surface (i) defining a first internal space in the housing which can accommodate the engaging portion when the grip is at the first angle and (ii) configured such that, when the engaging portion is in the first internal space, the first internal surface restricts the rotation of the engaging portion around the rotating axis and the movement of the engaging portion from the first internal space in a first direction toward the grip portion by the contact of the engaging portion with the first internal surface;

a second internal surface defining a second internal space (i) in the housing, (ii) that is in communication with the first internal space, (iii) having a shape to allow the rotation of the engaging portion around the rotating axis when the engaging portion is in the second internal space and (iv) that is in a second direction opposite the first direction from the first internal space; and a third internal surface (i) defining a third internal space in the housing and (ii) configured such that, when the engaging portion is in the third internal space, the third internal surface restricts the rotation of the engaging portion around the rotating axis by contact of the engaging portion with the third internal surface and permits the engaging portion to move along the rotating axis only when the grip is at a third angle relative to the housing that is different from the first angle;

wherein the third internal space is in communication with the second internal space and an outside of the housing.

15. The portable power tool according to claim 14, wherein:

the grip and the housing are configured such that alignment of the engaging portion with the third internal space allows insertion of the grip into the housing and removal of the grip from the housing.

16. The portable power tool according to claim 15, wherein:

the grip includes a sleeve and a biasing member within the sleeve;

the biasing member extends between a sleeve internal surface of the sleeve at a first end of the biasing member and a rod surface of the rod at a second end of the biasing member; and the grip and the housing are configured such that, when the engaging portion is in the first internal space, the grip can be removed from the housing by (i) pushing the grip against a biasing force of the biasing member to move the engaging portion into the second internal space and (ii) aligning the engaging portion with the third internal space.

* * * * *